(12) United States Patent
Vandevoorde et al.

(10) Patent No.: US 10,047,529 B2
(45) Date of Patent: *Aug. 14, 2018

(54) PANEL AND METHOD FOR MANUFACTURING PANELS

(71) Applicant: UNILIN, BVBA, Wielsbeke (BE)

(72) Inventors: Christof Vandevoorde, Zulte (BE); Christophe Naeyaert, Jabbeke (BE)

(73) Assignee: UNILIN, BVBA, Wielsbeke (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/603,806

(22) Filed: May 24, 2017

(65) Prior Publication Data

US 2017/0254095 A1 Sep. 7, 2017

Related U.S. Application Data

(63) Continuation of application No. 14/349,418, filed as application No. PCT/IB2012/055154 on Sep. 27, 2012, now Pat. No. 9,695,600.

(Continued)

(51) Int. Cl.
*E04F 15/10* (2006.01)
*E04F 15/02* (2006.01)
(Continued)

(52) U.S. Cl.
CPC .............. *E04F 15/107* (2013.01); *B32B 3/06* (2013.01); *B32B 15/14* (2013.01); *B32B 29/005* (2013.01); *B32B 29/06* (2013.01); *E04F 15/02022* (2013.01); *E04F 15/02033* (2013.01); *E04F 15/02038* (2013.01); *E04F 15/06* (2013.01); *B32B 38/06* (2013.01); *B32B 2250/26* (2013.01); *B32B 2255/12* (2013.01); *B32B 2255/26* (2013.01); *B32B 2260/028* (2013.01); *B32B 2260/046* (2013.01); *B32B 2307/554* (2013.01); *B32B 2309/02* (2013.01); *B32B 2309/04* (2013.01); *B32B 2309/12* (2013.01); *B32B 2317/125* (2013.01); *B32B 2471/00* (2013.01); *E04F 2201/0107* (2013.01); *E04F 2201/0115* (2013.01);
(Continued)

(58) Field of Classification Search
CPC .......... E04F 15/02005; E04F 15/02033; E04F 15/02038; E04F 2201/00–2201/0491; Y10T 428/24777
USPC ....................................... 428/192
See application file for complete search history.

(56) References Cited

U.S. PATENT DOCUMENTS

| 3,173,804 A | 3/1965 | Standfuss |
| 3,955,746 A | 5/1976 | Engman |

(Continued)

FOREIGN PATENT DOCUMENTS

| CN | 202202534 U | 4/2012 |
| DE | 19725829 C1 | 8/1998 |

(Continued)

OTHER PUBLICATIONS

International Search Report from PCT Application No. PCT/IB2012/055154, dated Jul. 9, 2013.

*Primary Examiner* — Z. Jim Yang
(74) *Attorney, Agent, or Firm* — Workman Nydegger

(57) ABSTRACT

A floor panel has a core, a print and a wear resistant layer. The core is assembled at least from a plurality of paper sheets, or other carrier sheets, impregnated with a thermosetting resin.

18 Claims, 8 Drawing Sheets

Related U.S. Application Data

(60) Provisional application No. 61/565,655, filed on Dec. 1, 2011, provisional application No. 61/542,622, filed on Oct. 3, 2011.

(51) Int. Cl.
*B32B 29/00* (2006.01)
*B32B 29/06* (2006.01)
*B32B 3/06* (2006.01)
*B32B 15/14* (2006.01)
*E04F 15/06* (2006.01)
*B32B 38/06* (2006.01)

(52) U.S. Cl.
CPC ............ *E04F 2201/0138* (2013.01); *E04F 2201/0153* (2013.01); *E04F 2201/023* (2013.01); *Y10T 156/1041* (2015.01); *Y10T 428/24488* (2015.01); *Y10T 428/24777* (2015.01); *Y10T 428/24868* (2015.01)

(56) References Cited

U.S. PATENT DOCUMENTS

| | | | |
|---|---|---|---|
| 4,006,048 A | 2/1977 | Cannady, Jr. et al. | |
| 4,044,185 A | 8/1977 | McCaskey, Jr. et al. | |
| 4,109,043 A | 8/1978 | Delapp | |
| 4,112,169 A | 9/1978 | Huffman et al. | |
| 4,140,837 A | 2/1979 | Drees et al. | |
| 4,952,277 A | 8/1990 | Chen et al. | |
| 5,047,282 A | 9/1991 | Mier | |
| 6,006,486 A | 12/1999 | Moriau et al. | |
| 6,332,733 B1 | 12/2001 | Hamberger et al. | |
| 6,490,836 B1 | 12/2002 | Moriau et al. | |
| 6,773,799 B1 | 8/2004 | Persson et al. | |
| 6,786,019 B2 | 9/2004 | Thiers | |
| 6,874,292 B2 | 4/2005 | Moriau et al. | |
| 6,928,779 B2 | 8/2005 | Moriau et al. | |
| 6,931,811 B2 | 8/2005 | Thiers | |
| 6,955,020 B2 | 10/2005 | Moriau et al. | |
| 6,993,877 B2 | 2/2006 | Moriau et al. | |
| 7,040,068 B2 | 5/2006 | Moriau et al. | |
| 7,055,290 B2 | 6/2006 | Thiers | |
| 7,249,445 B2 | 7/2007 | Thiers | |
| 7,328,536 B2 | 2/2008 | Moriau et al. | |
| 7,451,578 B2 | 11/2008 | Hannig | |
| 7,467,499 B2 | 12/2008 | Moriau et al. | |
| 7,527,856 B2 | 5/2009 | Thiers et al. | |
| 7,617,645 B2 | 11/2009 | Moriau et al. | |
| 7,621,094 B2 | 11/2009 | Moriau et al. | |
| 7,632,561 B2 | 12/2009 | Thiers | |
| 7,634,886 B2 | 12/2009 | Moriau et al. | |
| 7,634,887 B2 | 12/2009 | Moriau et al. | |
| 7,637,066 B2 | 12/2009 | Moriau et al. | |
| 7,637,067 B2 | 12/2009 | Moriau et al. | |
| 7,640,708 B2 | 1/2010 | Moriau et al. | |
| 7,644,554 B2 | 1/2010 | Moriau et al. | |
| 7,644,555 B2 | 1/2010 | Moriau et al. | |
| 7,644,557 B2 | 1/2010 | Moriau et al. | |
| 7,647,741 B2 | 1/2010 | Moriau et al. | |
| 7,647,743 B2 | 1/2010 | Moriau et al. | |
| 7,650,727 B2 | 1/2010 | Moriau et al. | |
| 7,650,728 B2 | 1/2010 | Moriau et al. | |
| 7,654,054 B2 | 2/2010 | Moriau et al. | |
| 7,658,048 B2 | 2/2010 | Moriau et al. | |
| 7,661,238 B2 | 2/2010 | Moriau et al. | |
| 7,665,265 B2 | 2/2010 | Moriau et al. | |
| 7,665,266 B2 | 2/2010 | Moriau et al. | |
| 7,665,267 B2 | 2/2010 | Moriau et al. | |
| 7,665,268 B2 | 2/2010 | Moriau et al. | |
| 7,669,376 B2 | 3/2010 | Moriau et al. | |
| 7,669,377 B2 | 3/2010 | Moriau et al. | |
| 7,673,431 B2 | 3/2010 | Moriau et al. | |
| 7,677,008 B2 | 3/2010 | Moriau et al. | |
| 7,681,371 B2 | 3/2010 | Moriau et al. | |
| 7,698,868 B2 | 4/2010 | Moriau et al. | |
| 7,698,869 B2 | 4/2010 | Moriau et al. | |
| 7,707,793 B2 | 5/2010 | Moriau et al. | |
| 7,712,280 B2 | 5/2010 | Moriau et al. | |
| 7,726,089 B2 | 6/2010 | Moriau et al. | |
| 7,735,288 B2 | 6/2010 | Moriau et al. | |
| 7,757,453 B2 | 7/2010 | Moriau et al. | |
| 7,770,350 B2 | 8/2010 | Moriau et al. | |
| 7,810,297 B2 | 10/2010 | Moriau et al. | |
| 7,827,754 B2 | 11/2010 | Moriau et al. | |
| 7,827,755 B2 | 11/2010 | Moriau et al. | |
| 7,841,145 B2 | 11/2010 | Pervan et al. | |
| 7,842,212 B2 | 11/2010 | Thiers | |
| 8,024,904 B2 | 9/2011 | Hannig | |
| 8,025,978 B2 | 9/2011 | Ruhdorfer | |
| 8,132,384 B2 | 3/2012 | Hannig | |
| 8,166,723 B2 | 5/2012 | Moriau et al. | |
| 8,272,187 B2 | 9/2012 | Meersseman et al. | |
| 8,341,915 B2 | 1/2013 | Pervan et al. | |
| 8,365,494 B2 | 2/2013 | Moriau et al. | |
| 8,381,477 B2 | 2/2013 | Pervan et al. | |
| 8,499,519 B2 | 8/2013 | Meersseman et al. | |
| 8,535,589 B2 | 9/2013 | Thiers | |
| 8,631,621 B2 | 1/2014 | Hannig | |
| 8,678,133 B2 | 3/2014 | Clausi et al. | |
| 2002/0014047 A1 | 2/2002 | Thiers | |
| 2002/0056245 A1 | 5/2002 | Thiers | |
| 2003/0024200 A1 | 2/2003 | Moriau et al. | |
| 2003/0024201 A1 | 2/2003 | Moriau et al. | |
| 2003/0029115 A1 | 2/2003 | Moriau et al. | |
| 2003/0029116 A1 | 2/2003 | Moriau et al. | |
| 2003/0029117 A1 | 2/2003 | Moriau et al. | |
| 2003/0159385 A1 | 8/2003 | Thiers | |
| 2003/0230382 A1 | 12/2003 | Zuraw et al. | |
| 2004/0018333 A1 | 1/2004 | Chen et al. | |
| 2004/0091694 A1* | 5/2004 | Holzer | B29C 35/0272 428/323 |
| 2004/0211143 A1 | 10/2004 | Hanning | |
| 2005/0016099 A1 | 1/2005 | Thiers | |
| 2005/0025934 A1 | 2/2005 | Thiers | |
| 2005/0166516 A1 | 8/2005 | Pervan | |
| 2005/0284075 A1 | 12/2005 | Moriau et al. | |
| 2005/0284076 A1 | 12/2005 | Moriau et al. | |
| 2006/0005499 A1 | 1/2006 | Moriau et al. | |
| 2006/0008630 A1 | 1/2006 | Thiers et al. | |
| 2006/0032177 A1 | 2/2006 | Moriau et al. | |
| 2006/0156672 A1 | 7/2006 | Laurent et al. | |
| 2006/0179772 A1 | 8/2006 | Thiers | |
| 2006/0179774 A1 | 8/2006 | Thiers | |
| 2006/0179775 A1 | 8/2006 | Thiers | |
| 2006/0179776 A1 | 8/2006 | Thiers | |
| 2006/0196138 A1 | 9/2006 | Moriau et al. | |
| 2006/0201095 A1 | 9/2006 | Moriau et al. | |
| 2006/0225370 A1 | 10/2006 | Moriau et al. | |
| 2006/0225377 A1 | 10/2006 | Moriau et al. | |
| 2006/0236630 A1 | 10/2006 | Moriau et al. | |
| 2006/0236631 A1 | 10/2006 | Moriau et al. | |
| 2006/0236632 A1 | 10/2006 | Moriau et al. | |
| 2006/0236633 A1 | 10/2006 | Moriau et al. | |
| 2006/0236634 A1 | 10/2006 | Moriau et al. | |
| 2006/0236635 A1 | 10/2006 | Moriau et al. | |
| 2006/0236636 A1 | 10/2006 | Moriau et al. | |
| 2006/0236637 A1 | 10/2006 | Moriau et al. | |
| 2006/0236638 A1 | 10/2006 | Moriau et al. | |
| 2006/0236643 A1 | 10/2006 | Moriau et al. | |
| 2006/0248829 A1 | 11/2006 | Moriau et al. | |
| 2006/0248830 A1 | 11/2006 | Moriau et al. | |
| 2006/0248831 A1 | 11/2006 | Moriau et al. | |
| 2006/0251870 A1 | 11/2006 | O'Brien et al. | |
| 2006/0254183 A1 | 11/2006 | Moriau et al. | |
| 2006/0254184 A1 | 11/2006 | Moriau et al. | |
| 2006/0254185 A1 | 11/2006 | Moriau et al. | |
| 2006/0260249 A1 | 11/2006 | Moriau et al. | |
| 2006/0272263 A1 | 12/2006 | Moriau et al. | |
| 2007/0051064 A1 | 3/2007 | Thiers | |
| 2007/0094986 A1 | 5/2007 | Moriau et al. | |
| 2007/0094987 A1 | 5/2007 | Moriau et al. | |
| 2007/0107360 A1 | 5/2007 | Moriau et al. | |
| 2007/0107363 A1 | 5/2007 | Moriau et al. | |

(56) References Cited

U.S. PATENT DOCUMENTS

| | | |
|---|---|---|
| 2007/0251188 A1 | 11/2007 | Moriau et al. |
| 2008/0010928 A1 | 1/2008 | Moriau et al. |
| 2008/0010929 A1 | 1/2008 | Moriau et al. |
| 2008/0010938 A1 | 1/2008 | Hannig |
| 2008/0053027 A1 | 3/2008 | Moriau et al. |
| 2008/0053028 A1 | 3/2008 | Moriau et al. |
| 2008/0060309 A1 | 3/2008 | Moriau et al. |
| 2008/0060310 A1 | 3/2008 | Moriau et al. |
| 2008/0060311 A1 | 3/2008 | Moriau et al. |
| 2008/0066416 A1 | 3/2008 | Moriau et al. |
| 2008/0134607 A1 | 6/2008 | Pervan et al. |
| 2008/0134614 A1 | 6/2008 | Pervan et al. |
| 2008/0199672 A1 | 8/2008 | Ruhdorfer |
| 2008/0263983 A1 | 10/2008 | Stanchfield et al. |
| 2008/0295432 A1 | 12/2008 | Pervan et al. |
| 2009/0038254 A1 | 2/2009 | Steele et al. |
| 2009/0038256 A1 | 2/2009 | Thiers |
| 2009/0049792 A1* | 2/2009 | Cappelle ............... B27B 5/06 52/745.19 |
| 2009/0155593 A1 | 6/2009 | O'Brien et al. |
| 2009/0183457 A1 | 7/2009 | Boucke |
| 2010/0009115 A1 | 1/2010 | Ruhdorfer |
| 2010/0104837 A1 | 4/2010 | Tanimoto et al. |
| 2010/0242391 A1 | 9/2010 | Meersseman et al. |
| 2010/0243138 A1 | 9/2010 | Laurent et al. |
| 2010/0247943 A1 | 9/2010 | Demeyere et al. |
| 2010/0313511 A1 | 12/2010 | Thiers |
| 2010/0319292 A1 | 12/2010 | Moriau et al. |
| 2011/0011524 A1 | 1/2011 | Thiers |
| 2011/0023405 A1 | 2/2011 | Moriau et al. |
| 2011/0088346 A1 | 4/2011 | Hannig |
| 2011/0167744 A1 | 7/2011 | Whispell et al. |
| 2011/0293904 A1* | 12/2011 | Smith ............... B41M 3/06 428/201 |
| 2012/0011796 A1 | 1/2012 | Hannig |
| 2012/0103722 A1 | 5/2012 | Clausi et al. |
| 2013/0011641 A1 | 1/2013 | Miyazaki et al. |
| 2013/0081349 A1 | 4/2013 | Pervan et al. |
| 2013/0104486 A1 | 5/2013 | Windmoller |
| 2013/0104487 A1 | 5/2013 | Moriau et al. |
| 2013/0192158 A1 | 8/2013 | Cappelle et al. |
| 2013/0247492 A1 | 9/2013 | Segaert |
| 2014/0053497 A1 | 2/2014 | Pervan et al. |

FOREIGN PATENT DOCUMENTS

| | | |
|---|---|---|
| DE | 102005021156 A1 | 11/2006 |
| DE | 102007062407 A1 | 6/2009 |
| EP | 1290290 A1 | 3/2003 |
| EP | 1711353 A2 | 10/2006 |
| EP | 1711353 B1 | 12/2009 |
| JP | H09262955 A | 10/1997 |
| JP | 2005153385 A | 6/2005 |
| WO | 199747834 A1 | 12/1997 |
| WO | 200196689 A1 | 12/2001 |
| WO | 2003016654 A1 | 2/2003 |
| WO | 2004050359 A1 | 6/2004 |
| WO | 2006043893 A1 | 4/2006 |
| WO | 2006066776 A2 | 6/2006 |
| WO | 2010088769 A1 | 8/2010 |
| WO | 2011118284 A1 | 9/2011 |

* cited by examiner

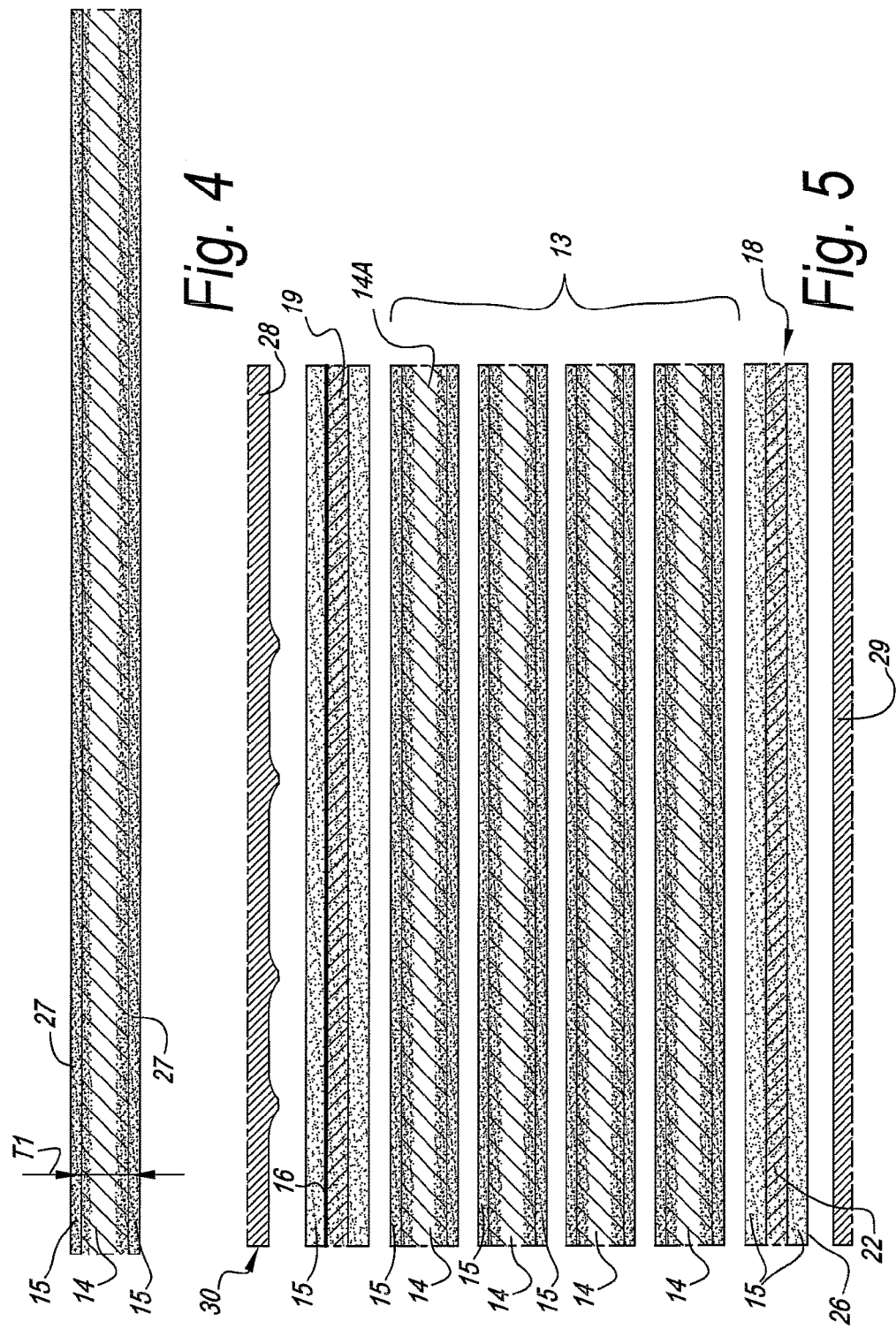

PANEL AND METHOD FOR MANUFACTURING PANELS

This application is a continuation of U.S. application Ser. No. 14/349,418, filed Apr. 3, 2014, which claims the benefit under 35 U.S.C. 119(e) to the U.S. provisional applications No. 61/542,622 filed on Oct. 3, 2011 and No. 61/565,655 filed on Dec. 1, 2011.

BACKGROUND

This invention relates to a panel, a covering formed of such panels, and a method for manufacturing such panels.

Primarily, the invention relates to floor panels, more particularly decorative floor panels for forming a floor covering, however, it is not excluded to apply the invention with other forms of coverings, for example, with wall panels, furniture panels, ceiling panels and the like.

The invention relates in particular to panels comprising a print, that forms a decoration, such as a wood print. It is clear that such panels can be rectangular and oblong, i.e. plank shaped. They can also be tile shaped, i.e. square.

Such panels are known per se, e.g. from WO 97/47834. They typically comprise a wood based core, such as core made from MDF or HDF (Medium or High Density Fiberboard). Such core material is known to be particularly prone to water absorption and deterioration because of contact with water and/or vapour. It is known to provide relief at the top side of such panels, e.g. from EP 1 290 290. The market calls for increasingly intricate or complex reliefs, wherein it is especially desired to create deeper relief features, such as cracks or nuts in a wood grain design, or lowered edges. EP 1 711 353 proposed a technique wherein the wood based core of such panel is deformed. However, such technique requires very heavy presses and can lead to porosity in the resin based top layer.

SUMMARY

The present invention relates to an alternative panel build-up that, according to preferred embodiments creates a solution to the problems with the panels comprised in the state-of-the art.

According to its first independent aspect, the invention relates to a panel, preferably a floor panel, comprising at least a core, a print and a wear resistant layer, wherein the core is assembled from a plurality of paper sheets, or other carrier sheets, impregnated with a thermosetting resin.

Preferably, the invention, according to any of its independent aspects, is applied in connection to panels, in particular floor panels, which, at least at two opposite edges, and preferably at all opposite edges, comprise coupling parts of the type allowing to couple two of such panels to each other, e.g. by means of a rotational, horizontal shifting, or downward movement of one panel in respect to the other, wherein these coupling parts form a first locking system, which effects a locking in the plane of the panels and perpendicularly to said edges, as well as form a second locking system, which effects a locking perpendicularly to the plane of the panels. It is especially with these panels that problems related to water and/or vapour contact may arise.

According to a special embodiment the invention is applied in connection to panels that can and/or are meant to be glued to the subfloor. Such panels, however, preferably also comprise coupling parts as mentioned above. With coupling parts a better aligning of the panels, to be glued down, can be reached. Such aligning can steer the horizontal alignment and/or the vertical alignment of coupled panels. Such alignment either leads to a fixed relative vertical and/or horizontal position, or to a limitation of possible movement of two panels relative to each other in the vertical and/or horizontal direction. Such possible movement is preferably limited to a maximum of 0.3 millimeters and is preferably less than 0.15 millimeters. Preferably the coupling parts at least allow a coupling between two of such panels without height differences at the location of the seam between the panels, or with height differences that are at maximum smaller than 0.2 or smaller than 0.05 millimeter. With a panel that can be glued down and that comprises coupling means, the choice of installing method is left to the consumer. With panels dedicated for glueing to the subfloor, the strength, dimension and/or function of the coupling parts can be limited. For example a simple tongue and groove connection only allowing for a vertical alignment, a connection formed by overlapping edges of coupled panels, or a connection formed by interconnected hook-shaped coupling parts only allowing for a horizontal alignment could suffice. Preferably, with such dedicated panels, the thickness of the panel is limited to a maximum of 7 millimeter, or even better to a maximum of 3 or 4 millimeter.

In the case where the invention is put to practice for floor panels that can or are meant to be glued down, as afore stated, the coupling parts do not necessarily need to form both a first and a second locking system, as defined above. A possible embodiment of such floor panels, includes rectangular, oblong floor panels, wherein the long pair of opposite edges is provided with coupling parts that form both a first and a second locking system, and wherein the short pair of opposite edges does not comprise coupling parts forming locking systems, or wherein the short pair of opposite edges comprises coupling parts forming only one of a first and a second locking system, e.g. respectively a tongue and groove connection or a connection with hook-shaped coupling parts.

In a preferred embodiment of the first aspect of the invention, the panel is realized as a panel substantially made of a core material on the basis of carrier sheets, preferably paper, and resin, preferably at least melamineformaldehyde and/or at least phenolformaldehyde resin and/or ureumformaldehyde resin. In such case said coupling parts, when available, are preferably integrally made of this core material, preferably entirely by means of a mechanical cutting treatment, more particularly by means of a milling process.

Preferably, the panel is free from board materials, such as MDF or HDF, synthetic boards or the like. In other words, preferably the complete panel of the first aspect of the invention is built up from sheets or sheetlike layers, preferably basically or completely from paper sheets, that have or have not been provided or impregnated with resin, preferably at least, but still better essentially or exclusively with thermosetting resin. According to a special form of embodiment some or all of the sheets can be provided with a mixture of a melamineformaldehyde resin and an elastomer, wherein said elastomer can comprise ethylene/vinyl chloride copolymer containing amide groups, a butadiene acrylonitrile copolymer containing carboxyl groups or a polyurethane resin containing carboxyl groups and an alkylene polyamine. Such mixtures are known as such, e.g. from U.S. Pat. No. 4,109,043 or U.S. Pat. No. 4,112,169, for the impregnation of lightweight decorative, cellulosic paper. Preferably the mixture comprises from 2.5 to 50 percent by dry weight of the elastomer.

According to preferred embodiments, the panels of the first aspect of the invention may show one or more of the following additional characteristics:

- the characteristic that at least said coupling parts, which are of the type allowing that two of such floor panels can be coupled to each other by means of a downward, rotational and/or horizontal shifting movement of one panel in respect to the other, are realized at least partially and preferably entirely of a core material that substantially consists of thermosetting resin and paper;
- the characteristic that at least said coupling parts, which are of the type allowing that two of such floor panels can be coupled to each other by means of a downward, rotational and/or horizontal shifting movement of one panel in respect to the other, are integrally realized from the core material;
- the characteristic that said coupling parts, which are of the type allowing that two of such floor panels can be coupled to each other by means of a downward, rotational and/or horizontal shifting movement of one panel in respect to the other, have a first locking system, which is formed at least of an upwardly directed lower hook-shaped portion situated at one of the respective edges, as well as a downwardly directed upper hook-shaped portion situated at the opposite edge, where in the cooperation of said upper and lower hook-shaped portion in coupled condition of two such panels is at least partially responsible for said locking in said horizontal direction;
- the characteristic that this panel is rectangular, either oblong or square, and thus comprises a first pair of opposite edges and a second pair of opposite edges, wherein both pairs of opposite edges comprise coupling parts allowing to mutually couple a plurality of such panels to each other, wherein these coupling parts at both pairs of edges form a first locking system which effects a locking in the plane of the panels and perpendicular to the respective edges, as well as form a second locking system which effects a locking perpendicularly to the plane of the panels, and wherein the coupling parts at one or at both said pairs of edges thus are formed by said coupling parts which are of the type allowing that two of such floor panels can be coupled to each other by means of a downward, rotational and/or horizontal shifting movement of one panel in respect to the other;
- the characteristic that the panel substantially consists of a core and that the coupling parts at both pairs of edges are realized substantially integrally from this core.

According to still further preferred embodiments, the panel of the first aspect of the invention may show the characteristic that the panel at least at two opposite edges comprises coupling parts, which are of the type allowing that two of such floor panels can be coupled to each other at the respective edges by means of a downward movement of one panel in respect to the other, and that said coupling parts are realized substantially of a core material that substantially consists of thermosetting resin and paper, wherein said coupling parts have a first locking system, which is formed at least of an upwardly directed lower hook-shaped portion situated at one of the respective edges, as well as a downwardly directed upper hook-shaped portion situated at the opposite edge, wherein the cooperation of said upper and lower hook-shaped portion in coupled condition of two such panels is at least partially responsible for said locking in said horizontal direction, and wherein said coupling parts have a second locking system effecting a locking perpendicularly to the plane of the panels, said second locking system comprising a separate insert connected to one of said two opposite edges. The use of such separate inserts in locking systems is known per se, e.g. from WO 03/016654 or WO 2006/043893.

The panels of the invention preferably are made in the form of rectangular oblong strips. The dimensions thereof may vary greatly. Preferably the panels of the first aspect have a length exceeding 1 meter, and a width exceeding 0.1 meter, e.g. the panels can be about 1.3 meter long and about 0.15 meter wide. According to a special embodiment the length of the panels exceeds 2 meter, with the width being preferably about 0.2 meter or more. The print of such panels is preferably free form repetitions.

In respect to thickness of the embodiments aimed at in the first aspect, this preferably varies between 2 and 6 mm.

At the decor side, the floor panels comprise a decorative layer or a print layer, which may carry any image. In a practical embodiment, the image represents a wood motif. More particularly, on each panel the appearance of a wooden plank, preferably a single wooden plank, is represented. Preferably the decorative layer or print layer is free from repetitions in its pattern.

Other additional preferred characteristics are clear from the claims. It is noted that all such characteristics can be applied in isolation or in any combination.

Preferably said plurality of carrier sheets or paper sheets comprised in the core, each have a weight between 150 and 450 grams per square meter, or even better between 200 and 300 grams per square meter. Preferably, cardboard sheets are used. Such cardboard sheets have a weight of 180 grams per square meter or more and such cardboard sheets are preferably manufactured by laminating several wet paper sheets together, and/or preferably these cardboard sheets are manufactured from fibers that for at least 50 percent by weight are obtained from recycled paper. Deinking of the recycled paper or its fibers can be dispensed with. The fibers for manufacturing the cardboard sheets might be obtained from a chemical or from a mechanical pulping process. The latter is more economical, but normally gives rise to fibers of shorter length, e.g. in average shorter than 1 mm. Cardboard sheets obtained from such fibers can still be used as a core carrier sheet in accordance with the first aspect, even though its impregnation is harder. The former process of chemical pulping is also known as the Kraft process, e.g. as described in U.S. Pat. No. 4,952,277.

It is remarked that heavy sheets, e.g. heavier than 150 grams per square meter or heavier than 180 grams per square meter, are hard to impregnate all through their thickness with said thermosetting resin. However, although problems like carrier splitting could be expected with such unsaturated sheets, the inventors have found that a core assembled at least from a plurality of resin unsaturated papers can still give rise to interesting properties of the attained core material, such as a water resistance suited for indoor use, and, that they could be provided with coupling parts by means of a milling process without the occurrence of paper splitting during milling. This is especially the case when the pressing operation, used for curing the resin, uses pressures higher than 30 or 38 bars. Preferably each of said plurality of carrier sheets is at least provided with an amount of resin, preferably thermosetting resin possibly mixed with an elastomer, that is more than 0.8 times the weight of the respective carrier sheet, wherein these weights are considered in dry condition, i.e. at a condition wherein the resin impregnated carrier sheet contains 7 percent by weight humidity, or less. Under such conditions the water resistance and milling quality is already acceptable. Preferably each of said plurality of carrier sheets is at least provided with an amount of resin, preferably thermosetting resin possibly mixed with an elastomer, that is less than 1.8 times the weight of the respective carrier sheet, wherein these weights are considered in dry condition, i.e. at a condition wherein the resin impregnated carrier sheet contains 7 percent by weight humidity, or less. The inventors have identified a preferred range of amount of resin to be applied to each of said plurality of carrier sheets, wherein this amount of resin ranges between 0.8 or 1, and 1.6 times the weight of the respective carrier sheet wherein these weights are considered in dry condition, i.e. at a condition wherein the resin impregnated carrier sheet contains 7 percent by weight humidity, or less. Working within this range combines an economical resin use, a smooth production, particularly smooth impregnation, and good quality of the final product.

The inventors have noted that cardboard sheets, even if they have a weight between 200 and 300 grams per square meter, can be readily impregnated to a sufficient extent.

It is noted that limiting the amount of resin to less than 1.8 or less than 1.6 times the weight of the respective carrier sheet, as here above, also leads to a stable pressing operation, even at high pressures, e.g. at 3 MPa, 4 MPa or above. Indeed, curing of thermosetting resins often gives rise to the creation of water as a byproduct of the polycondensation reaction during the pressing. Excessive water formation can lead to so-called explosions in the press, wherein the cured core material delaminates upon opening of the press. Such explosions are linked to a sudden drop in pressure caused by the opening of the press and leads to an immediate boiling and volume rise of free water molecules.

It is further noted that "unsaturated" does not necessarily mean that the respective impregnated sheet is able to take up still more resin. Indeed, the core of the carrier sheet, which is free from resin, or contains less resin, may be protected from further resin take up by the resinous layers at the surface of the carrier layer. In such case it is the protected core of the carrier which is unsaturated or contains less resin than it could do.

The inventors have further found that, preferably, said plurality of carrier sheets, possibly paper or cardboard sheets, has a specific density of less than 750 kilogram per cubic meter, or even better less than 700 kilogram per cubic meter, and preferably more than 500 kilogram per cubic meter. Such moderate specific density allows for a sufficient resin take-up even if the sheets are heavier than 150 or 180 grams per square meter. Example given use can be made of one or more paper or card board sheets having a weight of 200 to 250 grams per square meter and a density of 620 to 675 kilogram per cubic meter.

Preferably, said plurality of carrier sheets, possibly paper or cardboard sheets, has a porosity according to Gurley's method (DIN 53120) of between 8 and 20 seconds, preferably between 8 and 15 seconds. Such porosity allows even for a heavy sheet of more than 150 or 180 grams per square meter to be readily impregnated with a relatively high amount of resin, for example with an amount of thermosetting resin of more than 0.8 times the weight of the carrier sheet.

Preferably, said plurality of carrier sheets, possibly paper or cardboard sheets, has a water absorbency according to Klemm's method (DIN ISO 8787) of lower than 70 or 60 millimeters, but above 20 or 30 millimeter. Such absorbency allows for ready impregnation while maintaining a sufficient strength for handling the carrier sheet.

Preferably, said plurality of carrier sheets, possibly paper or cardboard sheets, has an ash content of below 20 percent or even below 15 or 10 percent. The lower the ash content the more resin can be absorbed unto or into the carrier sheets, especially when the carrier sheets comprise cellulose fibers, such as is the case with paper or cardboard sheets.

Preferably, said plurality of carrier sheets, possibly paper or cardboard sheets, has a wet tensile strength (DIN EN ISO 1924-2) of higher than 500 N/m, or even higher than 650 N/m. Such tensile strength improves the handling of highly resin loaded carrier sheets.

Preferably, said core comprises 5 to 15 or 6 to 15 resin impregnated paper or cardboard sheets. It is not excluded to use only 3 or 4 paper or cardboard sheets. 3 to 6, preferably 5, cardboard or paper sheets are preferably used to assemble the core of products or panels that can and/or are meant to be glued down, and/or for panels that possess a final thickness inferior to 3 millimeter. 7 to 10, preferably 9, paper or cardboard sheets are preferably used to assemble the core of products or panels that comprise coupling parts that form both a first and a second locking system, and/or for panels that posses a final thickness inferior to 5 millimeter, or even inferior to 4 millimeter, e.g. about 3.4 millimeter. 11 to 15 cardboard sheets can be used to assemble the core of products or panels having a thickness of 5 millimeter or more.

Preferably, said core is assembled from an impair number of cardboard sheets or other carrier layers. Such construction can be stable with respect to warping.

Preferably, all of the carrier layers comprised in said core, or at least the majority thereof, shows one or more of the above properties relating to weight, specific density, wet tensile strength, absorbency, porosity, ash content and/or the amount and type of thermosetting resin applied. It is clear that the perfect carrier layer shows all, or at least three of the above properties, wherein the ash content is the least important.

It is remarked that the weight of the carrier sheets can be defined using the procedure set forth in DIN ISO 536 and the specific density using the procedure set forth in DIN EN 20534.

It is noted that according to WO 2004/050359, an antistatic laminate panel could be obtained by mixing salt solutions into the impregnation resin. Such salt solutions or other antistatic agents could also be used in the resin of one or more of said carrier sheets, in an amount sufficient for obtaining an antistatic effect in the panels of the present invention. However, the inventors have noticed that especially salt solutions, like water based solutions of NaCl or KCl, lower the attainable water resistance with such panels. While being exposed to water for a long time, such panels showed bubble formation at the decorative surface. Hence, preferably, the carrier sheets are free from such salt solutions. In the cases where an antistatic effect is desirable, preferably use could be made of carbon particles, metal particles or other solid antistatic agents. It is also not excluded to include an electricity conducting layer in the core material, such as a metal layer, preferably perforated to enable penetration of the thermosetting resin. Preferably the print and the material, such as the wear resistant layer, above the print is free from antistatic agents. Such agents tend to lower the transparency of a synthetic layer. It is clear that it is not excluded that a sufficient antistatic effect could be obtained by using antistatic agents in, or only in the print, or the layer to which it can be applied, and/or in the wear-resistant layer. In this case salt solutions, like the ones named above, could still be used beneficially, since these have the least tendency to lower the transparency.

For the impregnation of the carrier sheets use can be made of a resin application technique that uses elevated pressure, i.e. above atmospheric pressure, for example more than 2 bars over pressure. The inventors have noticed that impregnation of papers with a weight of more than 125 grams per square meter benefits from such technique, as the resin can penetrate the core of the paper more readily, such that a complete impregnation can be reached, and at higher speeds. The risk of splitting of the paper or other carrier is greatly reduced. Such splitting might e.g. happen while milling possible coupling parts in the solidified core material. It is clear that such technique is especially useful for the impregnation of cardboard sheets.

Micro wave drying of impregnated papers or other carrier sheets, subsequent to and/or during impregnation e.g. to a residual humidity of less than 10 percent by weight, preferably about 7 percent by weight, is also beneficial from the point of view of minimizing the splitting risk. Micro waves are able to dry the resin that has impregnated the core of the paper or carrier better than e.g. a hot air oven, although a drying operation by means of such ovens is not excluded. A combination of microwave and hot air might be used.

It is clear that the use of pressurized impregnation techniques and/or micro wave drying of impregnated layers as such is an inventive aspect, even if such technique would be used for the manufacturing of other panels than the ones mentioned in relation to the first aspect. Such techniques can advantageously be used for impregnation with any resin, such as with a thermosetting resin, such as melamineformaldehyde resin, a thermoplastic resin or an elastomer, such as a waterbased dispersion of polyurethane or components therefor, or a mixture of both. For example such techniques could be used for impregnation with thermosetting resins, such as melamineformaldehyde resin, that comprise an amount, for example more than 5% dry weight, of a water based dispersion of a thermoplastic or elastomeric material, such as polyurethane or its components polyol and isocyanate. Such mixtures are e.g. known from U.S. Pat. No. 4,109,043 or U.S. Pat. No. 4,112,169. Preferably these techniques are used with paper sheets that have a paper weight larger than 20 grams per square meter, or even better more than 60 grams per square meter. It is clear that the heavier the paper, the more advantageous these techniques are, and impregnation of paper heavier than 125 grams per square meter, or even of 200 grams per square meter or more, or cardboard sheets is not excluded.

The inventors have found that using high pressure while consolidating the papers, for example in a press treatment by means of a short cycle press, is beneficial for the obtained water tightness of the core material. Preferably a pressure higher than 20 bar is used, and even better of 38 bars or more. Pressures upto 80 bars are not excluded. The use of high pressures, like 30 or 38 bars or more leads to a further migration of the resin into the core of the carrier sheets. This is especially desirable while working with sheets heavier than 150 grams per square meter and/or with cardboard sheets. As mentioned above the impregnation of such sheets with resin all through their thickness is hard to obtain during the normal impregnation process only.

As for the pressing temperature, preferably a temperature of 120 or 150 to 200 degrees is applied. This temperature allows curing the resin of the core's carrier sheets, without overcuring the resin at the outer surfaces of the panel. The lower range of temperatures from 120 to 150 degrees centigrade is preferred.

Preferably the pressing is executed during 30 to 300 seconds, or between 30 or 60 and 120 seconds. Such pressing time allows to obtain a sufficient curing of a panel having between 5 or 6 and 15 resin impregnated sheets, such as cardboard sheets of about 250 grams per square meter. The invention preferably uses a short cycle press or a single daylight press (German: Kurztaktpresse). These presses are operated discontinuously and press only one product or halfproduct at a time. After pressing cooling may be necessary to allow residual stresses to relax. A structured press plate can be used in order to create a surface relief at at least one of the outer surfaces of the pressed product, while the resin is being cured. Preferably the surface relief at least partially, but preferably wholly coincides with said print, such that the pressed product features a so-called registered-embossment, e.g. in accordance with EP 1 290 290 and/or EP 1 711 353.

It is clear that the whole build-up, namely at least the plurality of carrier sheets, the print and the wear resistant layer, and possibly further layers, can be obtained using only one such press treatment.

According to a special embodiment the panels of the first aspect are assembled by means of at least two press treatments. During a first press treatment or series of press treatments, at least a plurality of the carrier layers of the core and possibly the print or print layer are consolidated. For this first press treatment preferably a pressure higher than 20 bar is used, and even better of 38 bars or more. Pressures upto 80 bars are not excluded. As for the pressing temperature, preferably a temperature of 150 to 200 degrees is applied. Preferably the pressing is executed during 30 to 300 seconds, or between 60 and 120 seconds. During a second press treatment or a second series of press treatments, at least the wear resistant layer, or part thereof is attached to the consolidated whole, which was obtained during the first press treatment or the first series of press treatments.

Preferably said first press treatment is a single press treatment which is followed by the second press treatment, which is also a single press treatment. With the execution of the two press treatments a panel in accordance with the first aspect is obtained. It is, however, not excluded that further layers, such as superficial layers could be added to either of the panel surfaces in order to obtain the final build-up of the panel. Such superficial layer might be based on a waterbased lacquer, or dispersion, e.g. a water-based dispersion of polyurethane, and is especially interesting for obtaining the final upper surface of such panel. It is clear that such superficial layers might also be of interest when the panel of the first aspect is manufactured using only one press treatment or another series of press treatments.

Both press treatments can be executed in one and the same short cycle press (German: kurztaktpresse). This is in fact preferred, because the need for re-alignment of the product or halfproduct in between press treatments can be ruled out. For the second press treatment preferably a similar pressure and temperature is used as during the first press treatment. However, the pressing time of the second press treatment can be reduced with respect to the first press treatment to below 30 seconds, or even below 20 seconds.

The inventors have determined that extremely high abrasion resistance can be obtained by using two press treatments as mentioned above. Indeed, during the first press treatment, preferably the layers immediately underlaying the wear resistant layer are substantially or wholly cured. The hard particles comprised in the wear resistant layer are thereby prevented from being pushed down out of the top area of the floor panel into the print or below the print and stay in the zone where they are most effective, namely essentially above the print. The inventor has been able to reach an initial wear point according to the taber test as defined in EN 13329 of over 10000 rounds, where in one press treatment of layers with the same composition only just over 4000 rounds were reached. It is clear that the use of two press treatments as defined above, leads to a more effective use of available hard particles. An alternative advantage of using at least two press treatments lays in the fact that a similar wearing rate, as in the case where a single press treatment is used, can be obtained with less hard particles if the product is pressed twice. Lowering the amount of hard particles is interesting, since hard particles tend to lower the transparency of the wear resistant layer, which is undesirable. It becomes also possible to work with hard particles of smaller diameter, e.g. particles having an average particle diameter of 15 micron or less, or even of 5 micron or less. It is known that small particles are advantageous for enhancing the scratch resistance of thermosetting resin surfaces. Inherently, such particles possess a large surface area and the use of such particles leads to a large boundary surface between the particles and the thermosetting resin, leading to a loss of transparency. The present inventive technique however, allows to reduce the number of particles, and thus the area of said boundary surface, thereby increasing the transparency, while maintaining the scratch resistance.

It should be clear that the use of more than one press treatment is also advantageous for the manufacturing of other panels than the panels of the first aspect. Such technique could be used for the manufacturing of any panel that comprises on the one hand a wear resistant layer on the basis of a thermosetting synthetic material, possibly a carrier sheet, and hard particles, and, on the other hand, one or more layers underlaying the wear resistant layer on the basis of thermosetting synthetic material. The underlaying layers might comprise a décor layer, such as a printed paper sheet provided with thermosetting resin. As a core, such panel might essentially comprise a board material with a density of more than 500 kilograms per cubic meter, such as an MDF or HDF board material. In fact, the inventive way of manufacturing panels with a plurality of press treatments, might be put in practice with so-called DPL panels (Direct Pressure Laminate). In the latter case, during a first press treatment, at least the decorative paper layer provided with thermosetting resin, is cured and attached to the core material, preferably an MDF or HDF board material, whereby a whole is obtained of at least the décor layer and the board material, and possibly a counter balancing layer at the side of the board opposite the décor layer. During a second press treatment, the wear resistant layer is cured and attached to the obtained whole.

It is noted that WO 2006/066776 discloses a method for manufacturing DPL panels wherein two press treatments are used for achieving deep surface structures. The said document does not achieve increased wear resistance. The present inventive technique, because of the separate application and/or curing of the underlaying layer prior to the application and/or curing of the wear resistant layer, represents a significant step forward in the manufacturing of panels with a top layer based on thermosetting resins, such as melamine based resins.

It is therefore clear that the invention, according to an independent special aspect thereof, relates to a method for manufacturing panels, preferably floor panels, wherein said panels comprise at least a wear resistant layer and an underlaying layer, both at least comprising a thermosetting synthetic material, characterized in that said method comprises at least two press treatments, wherein in a first press treatment said underlaying layer is at least partially cured and in a second press treatment said wear resistant layer is at least partially cured and attached to said at least partially cured underlaying layer. Preferably said underlaying layer is a paper sheet provided with a decoration, such as a print, and provided with thermosetting resin. Preferably, during said first press treatment a consolidated whole of at least said underlaying layer and a core material is obtained. Said core material is preferably a wood based material, such as an MDF or HDF board material. Possibly said consolidated whole further comprises a counterbalancing layer at the side of the core material that faces away from said underlaying layer. Such a counterbalancing layer is preferably a thermosetting resin layer, that can comprise one or more carrier layers, such as paper sheets. For the thermosetting resin of the underlaying layer and/or the wear resistant layer preferably use is made of a melamine based resin, such as melamineformaldehyde resin. A similar or the same resin can be used for the possible counterbalancing layer. For the wear resistant layer preferably use is made of a carrier sheet, such as a paper sheet, that has been provided with an amount of resin and hard particles. Preferably said hard particles are aluminiumoxide particles. Preferably said hard particles have an average particle diameter between 20 and 200 micrometer, or even better between 60 and 100 micrometer. According to a special embodiment hard particles with a different average particle size are applied to the carrier sheet of the wear resistant layer. At the side of the wear resistant layer facing outwards particles with a smaller average size can be used than on the side of the wear resistant layer facing inwards. The smaller particles can have an average particle size smaller than 20 micrometer, e.g. between 1 and 20 micrometer, preferably between 1 and 15 micrometer, while the larger particles can have an average particle size between 30 and 120 micrometer, preferably between 30 and 90 micrometer. Preferably 1 to 15 grams of particles with the small average particle size are applied, while 2 to 25 grams of particles with large average particle size are applied. The inventor have found that, even with the larger particles alone, a taber resistance of more than 7500 rounds could be attained. For the underlaying layer as a carrier sheet preferably a paper sheet with a base paper weight of 50 to 125 grams per square meter is used, and even better of 65 to 90 grams per square meter. The underlaying layer before the first press treatment, and in a condition where the residual humidity level is below 7%, preferably possesses a weight of 100 to 375 grams per square meter, and even better of 100 to 175 grams per square meter, inclusive of resin and carrier sheet. For the wear resistant layer as a carrier sheet preferably a paper sheet of 15 to 35 grams per square meter is used, and even better of 20 to 30 grams per square meter. The wear resistant layer before application by means of the second press treatment, and in a condition where the residual humidity is below 7%, preferably possesses a weight of 35 to 105 grams per square meter, and even better 35 to 70 grams per square meter, inclusive of resin, hard particles, and carrier sheets. It is clear that the invention of this special aspect, is preferably applied for the manufacturing of panels with an upper surface that reaches a wear resistance (initial wear point) according to EN 13329 of at least 6500, or even at least 8500 rounds. The method is ideally suited for obtaining laminate floor panels with at least an AC5 classification in accordance with EN 13329.

According to an important embodiment of the abovementioned special aspect, during the first press treatment, substantially only a melamine impregnated decorative layer is pressed, e.g. using heated rollers. During the second press treatment this at least partially cured decorative layer is adhered to an underlying core material and preferably also to an overlying wear resistant layer, e.g. a melamine impregnated paper sheet comprising hard particles, like corundum. It is possible that during the same second press treatment the core material is assembled from a plurality of resin impregnated carrier layers, e.g. to form a panel in accordance with the first aspect of the invention. The second press treatment is preferably executed in a short cycle press.

According to a related, but also independent aspect, the invention also relates to a panel, preferably a floor panel, wherein said panel comprise at least a wear resistant layer and an underlaying layer having a decoration, such as a print or coloration, both at least comprising a thermosetting synthetic material, wherein said panel comprises hard particles, integrated in said thermosetting synthetic material and above said decoration, characterized in that said floor panel possesses a wear resistance IP>5000, as expressed by the initial wear point according to EN 13329, and in that the amount of hard particles above said decoration is less than 40, and even better less than 25 grams per square meter. In general, the inventors have found that a given IP value can be reached with less than IP/200 grams per square meter of hard particles above the print, as further elaborated in the below table. It is not excluded to reach the respective IP values, with less than IP/300 grams per square meter.

| IP value | Amount of particles needed < IP/200 |
|---|---|
| 3000 | <15 grams per square meter |
| 4000 | <20 grams per square meter |
| 5000 | <25 grams per square meter |
| 6000 | <30 grams per square meter |
| 7000 | <35 grams per square meter |
| 8000 | <40 grams per square meter |

Preferably said wear resistant layer is free from paper sheets or other carriers, or comprises at maximum only one paper sheet or other carrier. It is clear that the panel of this special aspect can be obtained with the aforementioned special method. It is further clear that this special aspect could be incorporated in a panel that further shows the characteristics of the first aspect of the invention or the preferred embodiments thereof. Preferably said underlaying layer is a paper sheet provided with a print, and provided with thermosetting resin. Preferably the panel comprises a core material below said underlaying layer, and said core material is preferably a wood based material, such as an MDF or HDF board material. Possibly said panel further comprises a counterbalancing layer at the side of the core material that faces away from said underlaying layer. Such a counterbalancing layer is preferably a thermosetting resin layer, that can comprise one or more carrier layers, such as paper sheets. For the thermosetting resin of the underlaying layer and/or the wear resistant layer preferably use is made of a melamine based resin, such as melamineformaldehyde resin. A similar or the same resin can be used for the possible counterbalancing layer. For the wear resistant layer preferably use is made of a carrier sheet, such as a paper sheet, that has been provided with an amount of resin and hard particles. Preferably said hard particles are aluminiumoxide particles. Preferably said hard particles have an average particle diameter between 20 and 200 micrometer, or even better between 60 and 100 micrometer. According to a special embodiment hard particles with a different average particle size are applied to the carrier sheet of the wear resistant layer. At the side of the wear resistant layer facing outwards particles with a smaller average size can be used than on the side of the wear resistant layer facing inwards. The smaller particles can have an average particle size smaller than 20 micrometer, e.g. between 1 and 20 micrometer, preferably between 1 and 15 micrometer, while the larger particles can have an average particle size between 30 and 120 micrometer, preferably between 30 and 90 micrometer. Preferably 1 to 15 grams per square meter of particles with the small average particle size are applied, while 2 to 25 grams per square meter of particles with large average particle size are applied and while keeping the total amount of particles above said decoration below 25 grams per square meter. The inventor have found that, even with the larger particles alone, a taber resistance of more than 7500 rounds could be attained. For the underlaying layer as a carrier sheet preferably a paper sheet with a base paper weight of 50 to 125 grams per square meter is used, and even better of 65 to 90 grams per square meter. The underlaying layer, in a condition where the residual humidity level is below 7%, preferably possesses a weight of 100 to 375 grams per square meter, and even better of 100 to 175 grams per square meter, inclusive of resin and carrier sheet. For the wear resistant layer as a carrier sheet preferably a paper sheet of 15 to 35 grams per square meter is used, and even better of 20 to 30 grams per square meter. The wear resistant layer, in a condition where the residual humidity is below 7%, preferably possesses a weight of 35 to 105 grams per square meter, and even better 35 to 70 grams per square meter, inclusive of resin, hard particles, and carrier sheets. It is clear that according to this special aspect of the invention panels with an upper surface that reaches a wear resistance (initial wear point) according to EN 13329 of at least 6500, or even at least 8500 rounds can be obtained. Ideally laminate floor panels with at least an AC5 classification in accordance with EN 13329 are obtained.

According to a special embodiment of the first aspect of the invention the carrier layers comprised in the core material comprise phenolformaldehyde, e.g. more than 10 percent by weight of the respective resinous carrier layer, while the top layer is substantially free from phenolformaldehyde, but comprises melamineformaldehyde, e.g. at least 10 percent by weight of the top layeris made from melamineformaldehyde.

According to the first aspect of the invention, the floor panel comprises at least a core, a print and a wear resistant layer, wherein the core is assembled at least from a plurality of paper sheets, or other carrier sheets, impregnated with a thermosetting resin. Of course the impregnation solution might comprise other constituents such as a thermoplastic or elastomeric resin and/or a water-based dispersion of polyurethane. As mentioned above, the use of such constituents is known as such from U.S. Pat. No. 4,109,043 and U.S. Pat. No. 4,112,169. It is also possible that one or more layers comprised in the core, preferably paper or cardboard layers with a weight exceeding 60 grams per square meter, for example exceeding 200 grams per square meter, are essentially provided with a thermoplastic or elastomeric resin, such as with a resin applied by means of a water-based or solvent based dispersion of polyurethane. Preferably at least one such layer is available in the upper half of the thickness of the panel.

The floor panel of the first aspect is preferably further characterized in that said paper or cardboard sheets each have a weight between 150 and 450 grams per square meter, and preferably between 200 and 300 grams per square meter.

This last range represents a break even between the impregnation speed, and the number of carrier sheets needed to build up a thickness of the core material. This range is also preferably chosen from the point of view of limited pressing time and temperature especially when the pressing is performed in a short cycle press.

Preferably the floor panel of the first aspect is further characterized in that the core by weight overall comprises more resin, preferably more thermosetting resin, than paper. With such an embodiment a desirable water tightness, or water resistance can be obtained.

Preferably the floor panel of the first aspect, is further characterized in that said floor panel has a density between 800 and 2400 kilograms per cubic meter, preferably between 1000 and 2000 kilograms per cubic meter. It has been found that water resistance is acceptable to very good in this range. Especially the embodiments wherein a density of between 1000 and 1600 kilograms per cubic meter is reached are interesting as they possess an acceptable water tightness, while being economical in manufacturing, both from the point of view of used materials, as from the point of view of processing energy and time.

For the floor panel of the first aspect, any kind of filling material can be used within the core, for example filling particles obtained from scrap paper, preferably from scrap impregnated paper. Such particles can be applied by mixing them in the impregnation liquid for the carrier sheets of the core. Preferably such filling particles have an average dimension smaller than 0.5 millimeter. Of course, such filling material could be obtained from scrap floor panels, which on their own, are made in accordance with the first aspect of the invention.

It has been found that the floor panels of the first aspect, can easily be manufactured with a deep relief. Preferably the relief comprises portions that have been embossed over a depth of more than 0.5 mm, or even more than 1 mm, with respect to the global upper surface of the floor panel. Preferably the embossments extend into one or more of the aforementioned carrier sheets of the core of the panel. Hereby it is meant that the respective carrier sheet deviates from the horizontal plane at the location of the embossment. Preferably the back side of the panel is planar, with the exception of a possible relief that is independent from the embossments at the upper surface of the panels. Such possible relief at the back side of the panel might be applied for improving glueing down of the panels and/or for improved slip resistance and/or for improved, i.e. diminished, sound generation or propagation.

The core of the panel of the first aspect of the invention might comprise one or more glass fiber layers, or another stabilizing layer, e.g. in order to obtain an enhanced dimensional stability especially in relation to expansion in length of the panels, due to an increase of humidity and/or temperature. Such glass fiber might serve as a carrier layer for thermosetting resin or not. Such glass fiber layer might be a so-called non-woven or a tissue. According to a first embodiment, such stabilizing layer might be located approximately halfway in the thickness of the core, e.g. between 40 and 60 percent of the thickness of the core. According to a second embodiment, such stabilizing layer might be located in the upper or lower half of the panel, e.g. about midway between the centre of the core and the upper, respectively bottom surface of the panel. In this case also warping effects can be counteracted.

The plurality of paper or other carrier sheets comprised in the core of the panel of the invention in accordance with the first aspect, might be "cross-linked". In such case at least two immediately adjacent or neighboring paper or cardboard sheets are oriented with their manufacturing or grain or fiber directions perpendicular or otherwise unparallel to each other. In such case an increased dimensional stability is obtained, especially in relation to expansion in length of the panels and/or in relation to warping of the panels, for example due to an increase of humidity and/or temperature.

The panels of the first aspect are preferably obtained from larger plates that are subsequent to the curing of the resin, i.e. subsequent to the pressing of the carrier sheets to a consolidated whole, divided into a plurality of such panels, e.g. by sawing. Such larger plates preferably show a build-up in accordance with the first aspect or the preferred embodiments thereof, before being divided.

Here Below, a First Example of the First Aspect of the Invention is Described Paper, more particularly cardboard, of 250 gram per square meter is put of a roll and provided with 366 gram per square meter dry weight of melamineformaldehyde resin. The impregnation could be performed at 40 meters per minute and dried using a hot air oven. Ten such sheets are stacked, a printed paper layer, provided with melamineformaldehyde resin and a transparent paper sheet provided with melamineformaldehyde resin and hard particles are put on top of the stack. The stack is compressed during 120 seconds with a short cycle press at 6 MPa (60 bar) at a temperature of 195° C. The obtained larger plate is sawn into a plurality of boards, that are subsequentely milled at the edge in order to provide for coupling parts.

A Second Example of the First Aspect of the Invention is as Follows

Paper of 250 grams per square meter was provided with melamineformaldehyde resin, until it showed a weight of 455 grams per square meter at a residual humidity level of 4.7% by weight.

12 such paper sheets were pressed at 2.8 MPa during 120 seconds and at 195° C. The resulting plate had a thickness of 4.3 millimeter. The plate had a density of 1.29 kg/dm$^3$. Tests for thickness swelling were performed in accordance with EN 13329, more particularly annex G thereof. A thickness swelling of less than 5% (4.6%) was obtained at 30° C. The panel absorbed less than 7% (6.5%) by weight of water.

12 such paper sheets were pressed at 6 MPa during 120 seconds and at 195° C. The resulting plate had a thickness of 3.84 millimeter. The plate had a density of 1.498 kg/dm$^3$. Tests for thickness swelling were performed in accordance with EN 13329, more particularly annex G thereof. A thickness swelling of less than 2% (1.53%) was obtained at 30° C. The panel absorbed less than 1% (0.7%) by weight of water.

Comparison of the two results shows that enlarging the pressure leads to a significantly better result with respect to water tightness.

A Third Example of the First Aspect of the Invention is as Follows

Paper of 250 grams per square meter was provided with melamineformaldehyde resin, until it showed a weight of 454 grams per square meter at a residual humidity level of 4.7% by weight.

5 such paper sheets were pressed at 2.75 MPa during 120 seconds and at 195° C. The resulting plate had a thickness of 1.7 millimeter. The plate had a density of 1.33 kg/dm$^3$. Tests for thickness swelling were performed in accordance with EN 13329, more particularly annex G thereof. A thickness swelling of less than 6% (5.8%) was obtained at 30° C. The panel absorbed less than 5% (4.6%) by weight of water.

A Fourth Example of the First Aspect of the Invention is as Follows

Paper of 250 grams per square meter is impregnated with a thermosetting resin to a final weight of 470 grams per square meter, at a residual humidity level of 4.5% by weight. The thermosetting resin was composed of 60 parts dry weight of melamineformaldehyde, 12.5 parts dry weight of sugar and 9.4 parts dry weight of NaCl (SodiumChloride) and 10 parts by weight of powder from scrap impregnated decor paper. Per 100 parts of the thermosetting resin, 27 parts of water were added to allow impregnation of the paper.

Upon sieving of the powder from scrap impregnated paper the following results were obtained:

| Sieve opening | Residual fraction (% by weight) |
| --- | --- |
| 2.5 mm | 0 |
| 1 mm | 0.3 |
| 0.8 mm | 0.4 |
| 0.5 mm | 18.8 |
| 0.2 mm | 32.9 |
| 0 mm | 47.6 |

From the sieving it can be seen that the average dimension of the powder is less than 0.5 millimeters.

The scrap impregnated paper was a printed paper with a base paper weight of 80 grams per square meter, and comprising 100 grams of melamineformaldehyde resin per square meter.

12 such paper sheets were pressed together to obtain a plate of 4.1 mm. The pressing was executed in a short cycle press during 120 seconds at 195° C. with a pressure of 8 MPa (80 bars).

Tests for thickness swelling were performed in accordance with EN 13329, more particularly annex G thereof. A thickness swelling of less than 4% was obtained at 30° C. and less than 2.5% at 20° C.

The carrier sheets used in the above examples, in this case paper or cardboard sheets, had a weight of 250 grams per square meter, a specific density of 650 kilogram per cubic meter, a wet tensile strength of about 700 N/m, a porosity according to Gurley's method of 12 seconds and an absorbency according to Klemm's method of 45 millimeter. The ash content of the carrier sheets was about 5%.

Further preferred embodiments of the first aspect are defined in the claims.

According to an independent second aspect, the invention relates to a floor panel comprising a core and a top layer comprising a print and a wear resistant layer, wherein the top layer comprises a thermosetting resin and/or a thermoplastic or elastomeric resin, with as a characteristic that the wear resistant layer comprises a surface layer formed from a radiation curing lacquer and/or from an acrylic lacquer and/or from a urethane lacquer and/or from a thermoplastic material, such as from polyvinylchloride, polyvinyldichloride, polypropylene, polyethylene, polyurethane, wherein the surface layer is preferably separately applied. In the case of thermoplastic materials the advantage is reached that the surface layer can be remolten, to structure or restructure the top of the floor panel, in order to form a relief or a new relief or an additional relief feature. While it is combined with an underlaying thermosetting resin comprising layer, this layer will not be prone to the remelting of the surface layer. Remelting can for example be done by heating using infrared light. The remelting need not be complete, a simple warming up close to the glass transition temperature, or slightly below or above, can be sufficient to enable structuring. Preferably the warming up is executed at a temperature lower than 160° C., or even at 130° C. or less. Structuring is preferably done using a press element, e.g. a structured press plate or roller, that is colder than 100° C., preferably at 23° C. or less, for example cooled down to 10° C. or less.

Particularly in respect to the invention according to the second aspect, the thickness of the panel could be between 2 and 15 millimeter, and even better between 5 and 12 millimeter.

With respect to the invention of the second aspect, it should be noted that such floor panel can have the advantage of being less prone to scratching, while it can be produced with few damage to tools used in the production. For example, the floor panel can be manufactured according to the direct pressure laminate (DPL) technique, wherein the composing layers are cured and adhered to one another in a single pressing step, e.g. using a short cycle press. The surface layer or the material thereof can be applied before or after the pressing, but preferably before pressing, such that the press plate is free from contact with the actual wear resistant layer, that might comprise hard particles such as corundum (Aluminiumoxide).

It should be noted that the use of a top layer that comprises a mixture of both thermosetting and thermoplastic or elastomeric material is advantageous for the adherence of a thermoplastic surface layer. The thermoplastic or elastomeric material in the mixture can be a water or solvent based dispersion of a thermoplastic or elastomeric resin, such as a water based or solvent based dispersion of polyurethane. Preferably mixtures as described in U.S. Pat. No. 4,109,043 or U.S. Pat. No. 4,112,169 are used.

Mixtures of thermosetting resin and, thermoplastic or elastomeric resins, are sometimes desired for achieving a surface with less cracks, as disclosed in U.S. Pat. No. 4,109,043. However such surfaces are less preferred from the point of view of resistance to scratches, chemicals, cigarettes, wear and so one. The present invention according to its second aspect proposes to further protect the surface by means of a lacquer or by means of a completely thermoplastic surface layer.

According to a special embodiment of the second aspect, a floor panel is obtained comprising a core, preferably made from a wood-based material like MDF or HDF, and a top layer comprising a print and a wear resistant layer, wherein the top layer comprises decorative paper layer impregnated with a thermoplastic or elastomeric resin, wherein on top of the decorative paper layer a liquid coating comprising melamine resin and hard particles like corundum, an wherein on top of this liquidly applied coating a thermoplastic or elastomeric surface layer, preferably of pure thermoplastic or elastomeric material, is separately applied. At the back side of the panel preferably a thermoplastic or elastomeric material based backing layer is available, preferably a paper sheet impregnated with thermoplastic or elastomeric resin. The thermoplastic or elastomeric surface layer allows for restructuring of the top layer, when needed in production. The liquidly applied melamine coating gives rise to a better performance in wearing. The whole build-up can lead to a stable panel. By way of example the liquid melamine coatings of DE 197 25 829 C1 or U.S. Pat. No. 3,173,804.

The above mentioned special embodiment could also be defined as a panel with a core and a top layer, wherein core and/or the top layer comprise at least two layers of thermoplastic or elastomeric material, with at least a layer of thermosetting material there between. It is clear that the present invention independently also broadly relates to such panels.

Further preferred embodiments of the second aspect are defined in the claims.

WO 2010/088769 describes water-based dispersions that could be used in a mixture with a thermosetting resin such as melamine, as is required in some preferred embodiments of the invention according to any aspect thereof.

In general, the print of the floor panels of the invention, according to any of the independent aspects, can either be provided on a layer, preferably on a paper sheet, preferably on a sheet having a weight between 20 and 150 grams per square meter, before consolidation of the core material and/or adherence to the core material, or be applied on the core material after it has been solidified, for example by means of a digital printing technique, such as inkjet printing. In this last case preferably waterbased inks are used.

According to a special possibility said print was originally applied to the back side of said wear resistant layer, which included a carrier sheet, such as a paper layer.

In general, the wear resistant layer of the floor panels of the invention, according to any of the independent aspects, preferably comprise a resin, preferably a thermosetting resin impregnated paper sheet and/or hard particles, such as aluminiumoxide particles having an average particle size between 1 and 200 micrometer. Preferably such wear resistant layer comprises at least one, but even better at least two, transparent paper carrier sheets having a weight between 15 and 80 grams per square meter.

For the resin of the wear resistant layer and/or the possible printed paper sheet preferably melamineformaldehyde resin is applied. Preferably additives are comprised in the resin, such as plasticizer, release agent and/or hardener. For the plasticizer use can be made of an amino-functional monomer.

The present invention according to a further independent aspect also relates to a panel, comprising a plate shaped core material, such as a wood-based core material, preferably an MDF or HDF board, and a top layer, wherein the top layer comprises a decorative paper layer, preferably with a print, and a transparent wear resistant layer on the basis of a thermosetting resin, such as melamine, characterized in that the top layer further, in between said core and said decorative layer, comprises a cardboard sheet impregnated with resin, preferably thermosetting resin, such as melamineformaldehyde, phenolformaldehyde or ureumformaldehyde resin, and wherein said decorative layer comprises thermoplastic or elastomeric resin, preferably mixed with a thermosetting resin, such as melamine. Such panel is very well suited to be manufactured with deep reliefs, such as with relieved or embossed portions that extend into the cardboard sheet, or even into the core material. Preferably such portions are at least embossed over a depth of 0.5 millimeter, or even 1 millimeter or more. Preferably such embossed portions at least comprise lowered edge regions at one or more edges of the panels. The decorative layer is preferably impregnated with the mixtures known from U.S. Pat. No. 4,109,043 or U.S. Pat. No. 4,112,169, and hence preferably comprise, next to melamineformaldehyde resin, also polyurethane resin and/or acrylic resin. The inventors have found that such inventive build-up of the top layer allows forming deep relieved portions without tearing the decorative layer and without occurrence of cracks or other porosities in the surface of the wear-resistant layer. It is noted that the here abovementioned wear-resistant layer could comprise a paper sheet, or could be applied as a liquid melamine coating over the decorative layer, in the same way as explained in connection to an abovementioned special embodiment of the second aspect of the invention.

BRIEF DESCRIPTION OF THE DRAWINGS

With the intention of better showing the characteristics of the invention, hereafter, as an example without any limitative character, several preferred forms of embodiment are described, with references to the accompanying drawings, wherein:

FIG. 4 schematically illustrates a carrier sheet that can be used to assemble the core material of the panel of the invention;

FIGS. 5 to 7 schematically illustrates some steps in a preferred method for manufacturing the panel of the invention;

DETAILED DESCRIPTION OF VARIOUS EMBODIMENTS

Figure 1:
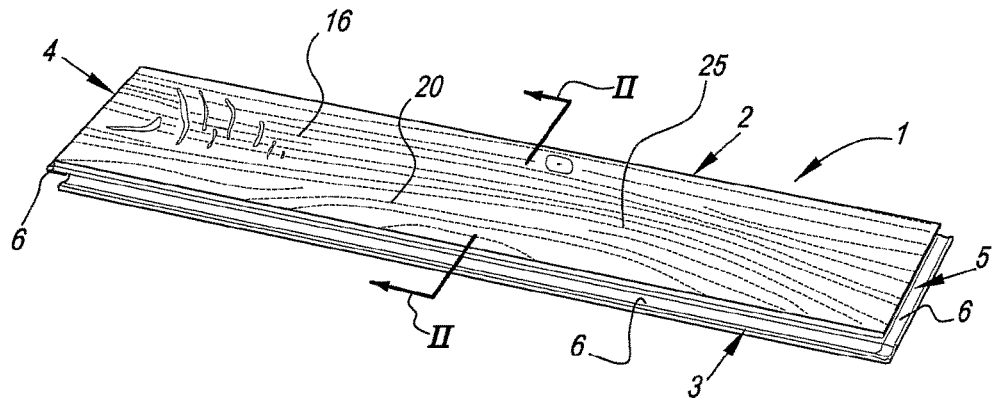
FIG. 1 schematically and in perspective represents a panel, more particularly a floor panel, according to the invention.

FIG. 1 schematically represents a floor panel 1 in accordance with the present invention. In this specific case it relates to a rectangular and oblong panel 1 having a first pair of opposite edges 2-3, namely the long edges, and a second pair of opposite edges 4-5, namely the short edges. Both pairs of edges 2-3, 4-5 have been provided with coupling parts 6.

Figure 2:
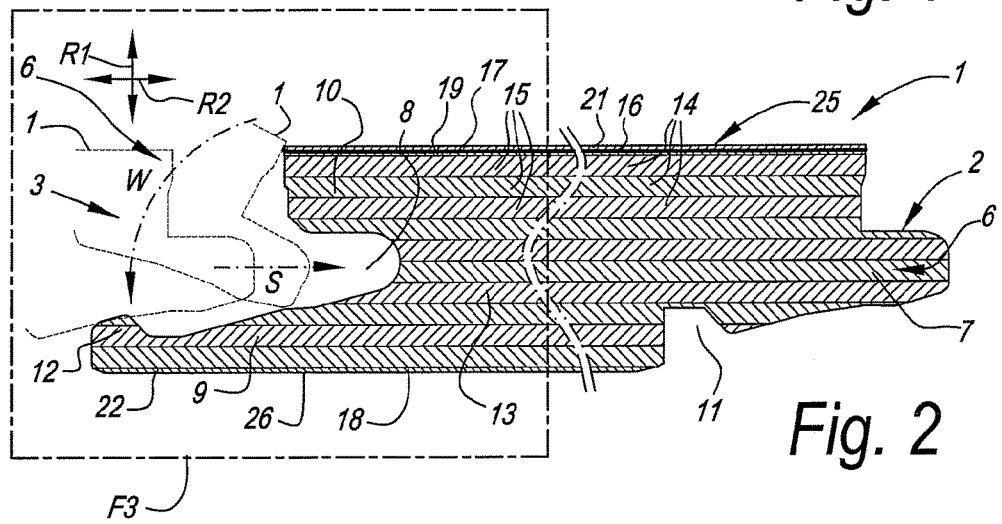
FIG. 2, at a larger scale, represents a cross-section according to line II-II in FIG. 1.

FIG. 2 clearly illustrates that the coupling parts 6 at the long edges 2-3 form both a first locking system, effecting a locking in the plane of the panels 1 and perpendicularly to said edges 2-3, namely a locking in the horizontal direction R2, and a second locking system, effecting a locking perpendicularly to the plane of the panels 1, namely a locking in the vertical direction R1. The coupling parts 6 illustrated here are basically formed as a tongue 7 and groove 8 connection, allowing for said locking in the vertical direction R1, wherein the tongue 7, respectively at least one of the groove lips 9-10, in this case only the lower groove lip 9, has been provided with additional locking elements 11-12, effecting said locking in said horizontal direction R2. The respective locking elements 11-12 are formed as an excavation at the lower side of the tongue 7, that cooperates with a protrusion at the upper surface of the lower groove lip 9.

The coupling parts 6 are of the type that allows that two of such panels 1 can be coupled to each other, upon choice, by a rotational movement W or a horizontal shifting S movement of one panel 1 in respect to the other. In this case the coupling parts 6 are realized entirely of the core material 13.

FIG. 2 further illustrates that the core material 13 of the panel 1 in the example is assembled at least from a plurality of carrier sheets 14 provided with or impregnated with thermosetting resin 15. In this case 10 impregnated cardboard sheets 14 are used, each having, in this case, a not impregnated weight of above 180 grams per square meter, e.g. about 220 or 250 grams per square meter. Of course more or less cardboard sheets 14 could be used. However with the coupling parts 6 illustrated here, preferably seven or more sheets 14 are used, e.g. nine cardboard sheets 14. The use of an impair number of cardboard sheets 14 can lead to an increased stability of the panels 1.

The panel 1 of FIG. 2 further comprises a print 16, a wear resistant layer 17 and a backing layer 18 or counterbalancing layer. The print 16 has been provided on a paper sheet 19, in this case, having a weight of about 60 to 80 grams per square meter, and its pattern or image represents a wood motif 20, more particularly the image of only one wooden plank. The print 16 is free from repetitions in its pattern. According to a variant the print 16 could be provided at the back said of the wear resistant layer 17, or more particularly the paper layer 21 possibly comprised therein. The wear resistant layer 17 of this example does comprise a paper sheet 21, in this case impregnated with thermosetting resin 15 and possibly hard particles, such as aluminiumoxide. The backing layer 18 or counterbalancing layer also comprise a paper sheet 22 impregnated with thermosetting resin 15.

The panel 1 illustrated in FIG. 2 is free from board materials, such as MDF or HDF, synthetic boards or the like. The complete panel 1 is built up from sheets 14-19-21-22, in this case cardboard sheets 14 and paper sheets 19-21-22, that have been provided with resin.

Figure 3:
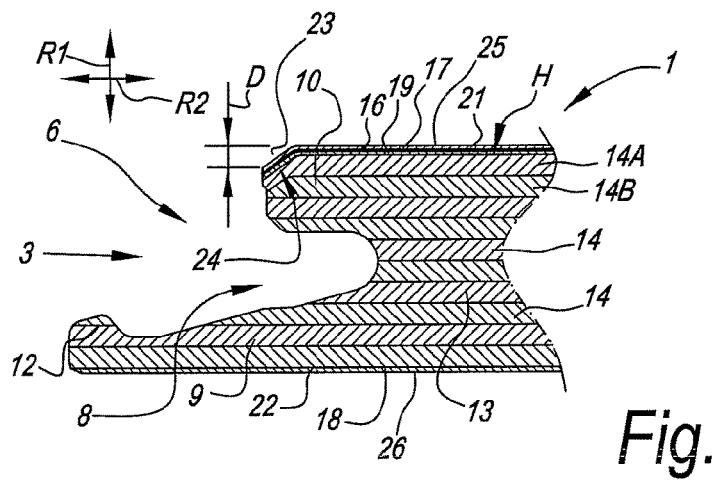
FIG. 3, in a view on the area indicated as F3 on FIG. 2, represents a variant.

FIG. 3 shows an example where the panel 1 has been manufactured with a relief 23. In this case the panel 1 comprises at least at one edge 3, but preferably at both edges of a pair of opposite edges 2-3, a portion 24 that has been embossed to form a lowered edge region, e.g. as illustrated here in the form of a beveled edge. Preferably such portion 24 is embossed over a depth D of more than 0.5 or more than 1 millimeter. FIG. 3 clearly illustrates that the wear resistant layer 17 and the print 16 continuously extend from the upper surface 25 of the panel over the entire surface of the embossed portion 24. FIG. 3 further illustrates that, in the example, the embossed portion 24 extends into some of the carrier sheets 14 in the core material 13. The upper two carrier sheets, or cardboard sheets 14A-14B deviate from the horizontal plane H at the location of the embossed portion 24 or beveled edge. The back side 26 of the illustrated panel 1 is planar. It is clear that embossed portions 24 need not necessarily be available at the edge 3 of the panel 1, neither should such embossed portion 24 necessarily imitate or form beveled edges. Other relief features could be introduced in the upper surface 25, such as scraping paths e.g. extending in the longitudinal direction of the panels 1 and similar to the ones disclosed in EP 1 711 353, wood knots, wood cracks, wood pores, wood nerves, stone relief features and so one.

According to a special not illustrated embodiment of embossed portions 24 at the upper surface 25 of the panels 1 of the invention, the print 16 is interrupted at the location of the embossed portion 24, thereby exposing the color of an underlying layer, such as a carrier sheet 14A of the core. Interruption of the print 16 can be used to create particular depth effects. The wear resistant layer 17 can, but should not necessarily, extend continuously at a location where the print 16 is interrupted. Such interruption of the print 16 can be created at the time of forming the embossment, e.g. in the press by tearing a printed paper sheet 19 at the location of the embossed portion 24, and/or prior to forming the embossment by cutting certain parts out of the printed layer 19, e.g. by laser cutting.

FIG. 4 illustrates an unsaturated cardboard sheet 14 that can be used to assemble the core material 13 of a panel in accordance with the first aspect of the invention. The applied resin 15 forms layers 27 both at the upper and lower surface of the cardboard sheet 14. As illustrated here, the cardboard sheet 14 has not been impregnated all through its thickness T1.

Figure 6:
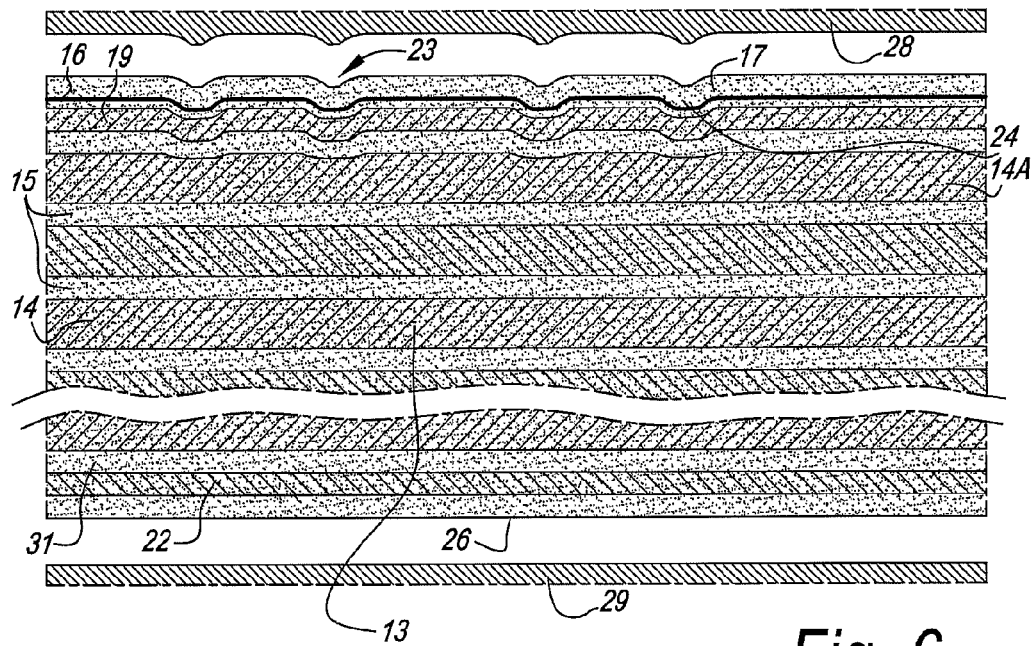

FIG. 5 illustrates that a stack of cardboard sheets 14 provided with resin 15, in this case four sheets 14, a resin impregnated print layer 19 and a resin impregnated paper layer 22 for use as a backing layer 18 or counterbalancing layer, can be put between the press plates 28-29 of a short cycle press 30 in order to consolidate them into the hardened whole 31, illustrated in FIG. 6. At the same time embossed portions 24 are formed by means of the structured press plate 28 that comes into contact with the side of the stack that comprises the print layer 19. In this example the resin 15 of the print layer 19 forms the wear resistant layer 17, which is free from paper sheets. It is important to note that because of the pressure and heat applied in the press 30, the resin 15 has been able to further penetrate or flow into the cardboard sheets 14, as compared to their condition after impregnation, e.g. as illustrated in FIG. 4. It is possible that due to the press treatment the cardboard sheets 14 become impregnated all through their thickness T1.

Figure 7:
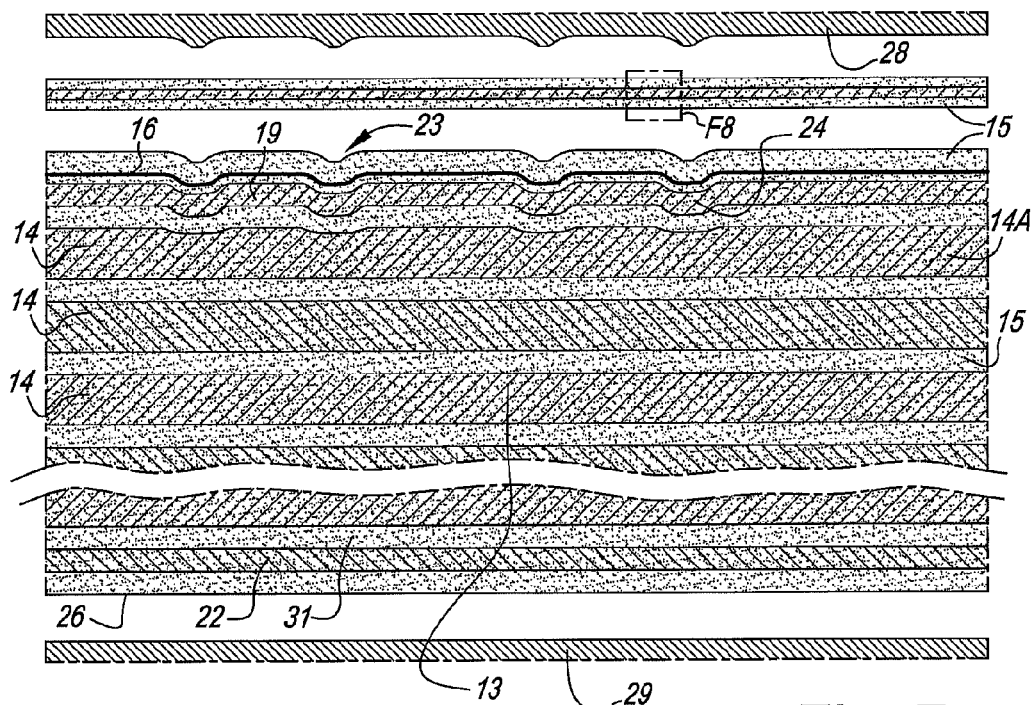
Figure 8:
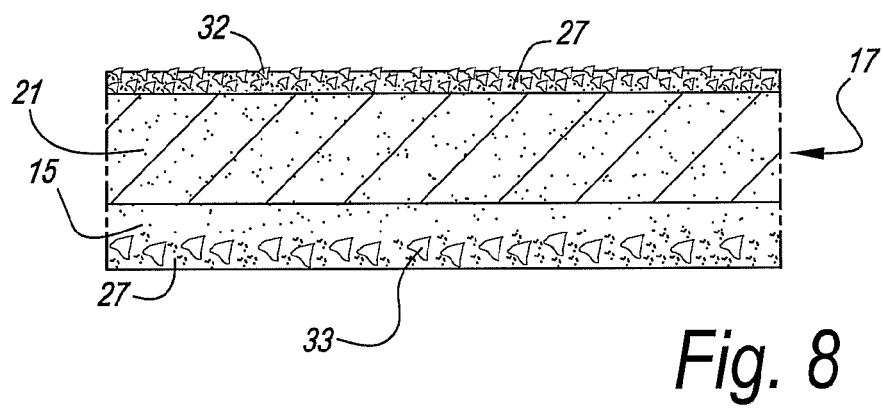
FIG. 8 at a larger scale illustrates the area indicated in FIG. 7 as F8.

FIG. 7 illustrates that an extra resin 15 impregnated paper sheet 21 can be adhered to the consolidated whole 31 in a second subsequent press treatment. As illustrated in FIG. 8 such paper sheet 21 might further include hard particles 32-33. In this example hard particles 32-33 are included at both surfaces of the sheet 21, more particularly in the resin layers 27 at the respective surfaces of the sheet 21, wherein the particles 32 facing the press plate 28, or structured press plate 28, have a smaller average particle size than the particles 33 at the other surface of the sheet 21. For effective particle sizes reference is made to the introduction, where such wear resistant layer 17 is described in relation to a special independent aspect. In the example of FIG. 7, the final wear resistant layer 17 will mainly be formed by the resin 15 and hard particles 32-33 of this extra sheet 21, wherein this sheet 21 is or becomes transparent or translucent, such that it will still be possible to observe the print 16 through it. Such extra sheet 21 can be a paper formed from alpha cellulose, having a weight between 15 and 30 grams per square meter.

It is clear that the method illustrated in FIGS. 6 to 8 form an embodiment of the aforementioned special independent aspect, wherein said method comprises at least two press treatments, wherein in a first press treatments, namely the one of FIG. 6, the underlaying layer, i.e. preferably at least all core carrier layers 14 and possibly the print layer 19, is cured and in a second press treatment the wear resistant layer 17 is cured and attached to the cured underlaying layer, e.g. to the hardened whole 31 of FIG. 6.

It is noted that such extra resin impregnated sheet 21, like the one illustrated in FIG. 8, forming a wear resistant layer 17 or part thereof, can also be included in the stack prior to the first press treatment, on top of the print layer 19. In such case a second press treatment is not necessary.

Figure 9:
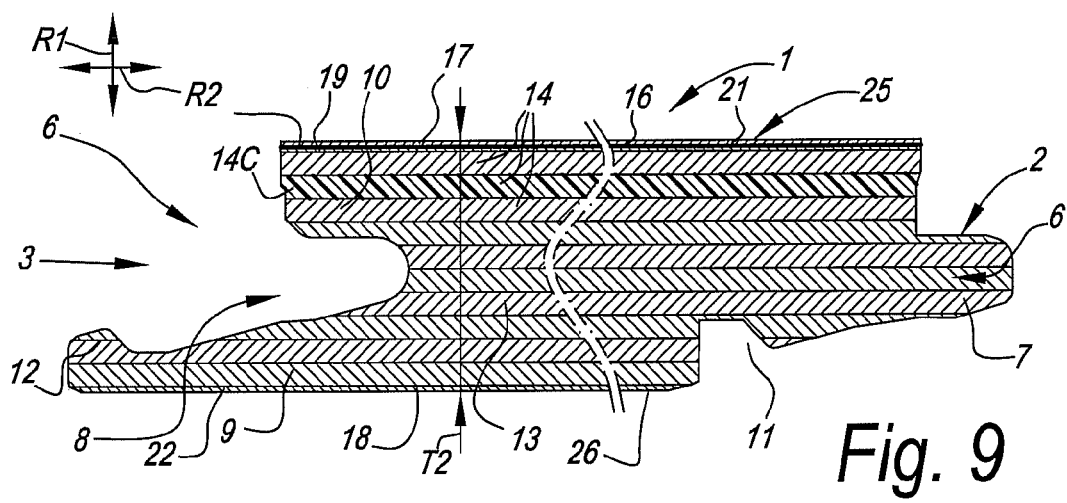
FIG. 9 in the same view as FIG. 2 illustrates a variant.

FIG. 9 illustrates an embodiment of a panel 1 where at least one of the carrier sheets 14C of the core, in this case only one, has been impregnated with a mixture of thermosetting and thermoplastic or elastomeric resin. Preferably use is made of a mixture of 1/ melamineformaldehyde or ureumformaldehyde resin;

2/ an acrylic resin, like styrene acrylic copolymer resin, preferably a waterborne dispersion of a styrene-acrylic copolymer of fine particle size (smaller than 20000 Angstrom or smaller than 4000 or 1000 Angstrom), preferably free of plasticizer and solvent, or a polyurethane resin, such as a waterborne dispersion of HDI (hexamethyleendiisocyanate).

3/ preferably an alkylene polyamine, such as ethylene diamine; and

4/ possibly upto 7%, preferably between 0.2 and 2%, aminomethyl-propanol as dispersant.

In the example of FIG. 9 a sheet 14C impregnated with such mixture is at least available in the upper half of the thickness T2 of the panel 1. In the example the related sheet 14C is situated entirely above the tongue 7 and groove 8. The use of such sheet 14C can lead to a more stable panel 1.

It is noted that such mixture could be applied, either solely or in combination with the application in a carrier layer 14C of the core 13, as the impregnating resin for the print layer 19 and/or the wear resistant layer 17.

Figure 10:
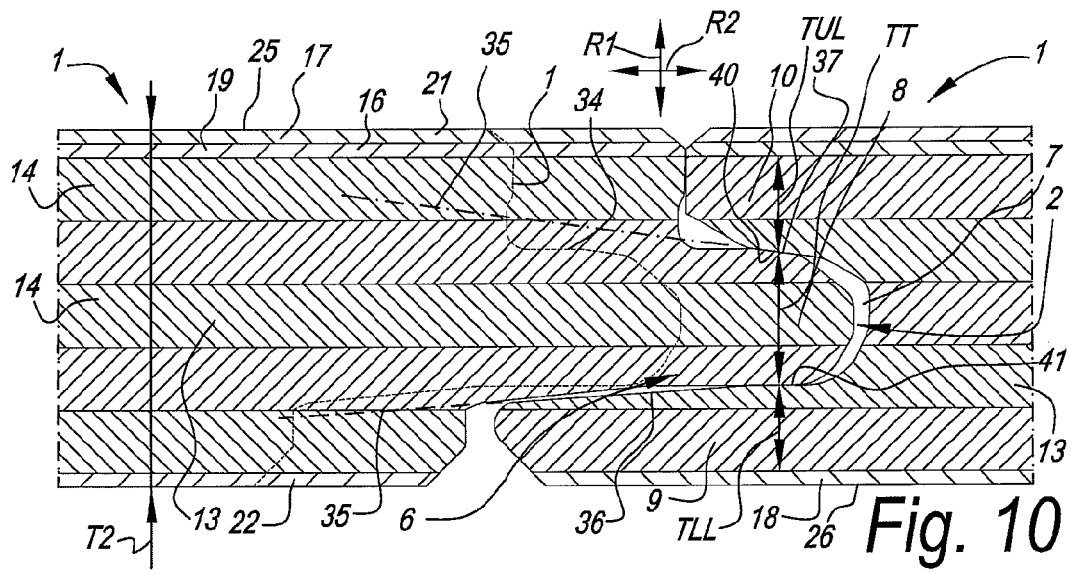
FIGS. 10 to 14 in a view on the area indicated as F3 on FIG. 2, represents variants, illustrated in installed condition.

FIG. 10 shows an embodiment of a floor panel 1 that can or is meant to be glued down. The core material 13 of the panel 1 is assembled from five resin impregnated cardboard sheets 14, each having a weight exceeding 180 grams per square meter. The floor panel 1 possesses a total thickness T2 of less than 3 millimeter, namely a thickness T2 of about 2 millimeter. Further the panel 1 includes a print 16, a wear resistant layer 17 and a backing 18 or counterbalancing layer. The illustrated panel 1 comprises at at least one pair of opposite edges 2-3 coupling parts 6 that allow for alignment of the panels 1. In this case vertical alignment of the coupled panels 1 is obtained by means of a tongue 7 and groove 8 connection, that limits possible movement of the panels 1 in the vertical direction R1, but is, in this case, unable to counteract separation of the coupled panels 1 in the horizontal direction R2. The panels 1 are connected without height differences, or at least with height differences smaller than 0.05 millimeter between the respective global upper surfaces 25 of the coupled panels 1.

The tongue 7 and groove 8 connection illustrated in FIG. 10 comprises a lower groove lip 9 that is longer than the upper groove lip 10. This special preferred feature allows to prevent glue from the underground to enter into the coupling zone while shifting the tongue 7 into the groove 8. The dashed line 34 shows that the tongue 7 can be lowered in the direction R1 to rest on or above the lower groove lip 9. Already in this position a barrier is created against entering of the glue. From this position the panel 1 is shifted towards the groove 8. The possible obstacle to correct joining, formed by glue gathered in front of the lower groove lip 9, is better controlled by means of such groove geometry.

A further preferred feature is embodied by the wedge shaped sidewards opening of the groove 8, as illustrated by the dash-dotted lines 35 which enables for an automatic aligning of the tongue 7 into the groove 8, thereby making a connection without or only with minor height differences between the upper surfaces 25 of the coupled panels 1. To obtain this, preferably at least the upper surface of the lower groove lip 9 comprises a portion 36 that guides the lower side of the tongue 7 in an upward direction when the tongue 7 is slid into the opening of the groove 8. As illustrated here, also the lower surface of the upper groove lip 10 comprises a portion 37 that guides the tongue 7, in this case the upper side of the tongue 7 in an downward direction when the tongue 7 is slid into the opening of the groove 8. It is also possible to create a tensioned tongue 7 and groove 8 connection by overdimensioning the tongue 7 and clamping it into the wedge shaped opening of the groove 8. It is noted that this preferred feature is especially relevant with panels 1 that can or are meant to be glued down, since in such cases the thickness of the glue layer on the underground can differ from one place to the other. The present preferred feature better warrants an acceptable alignment in between panels 1 and prevents problems while joining the tongue 7 into the groove 8 to a large extent.

Figure 11:
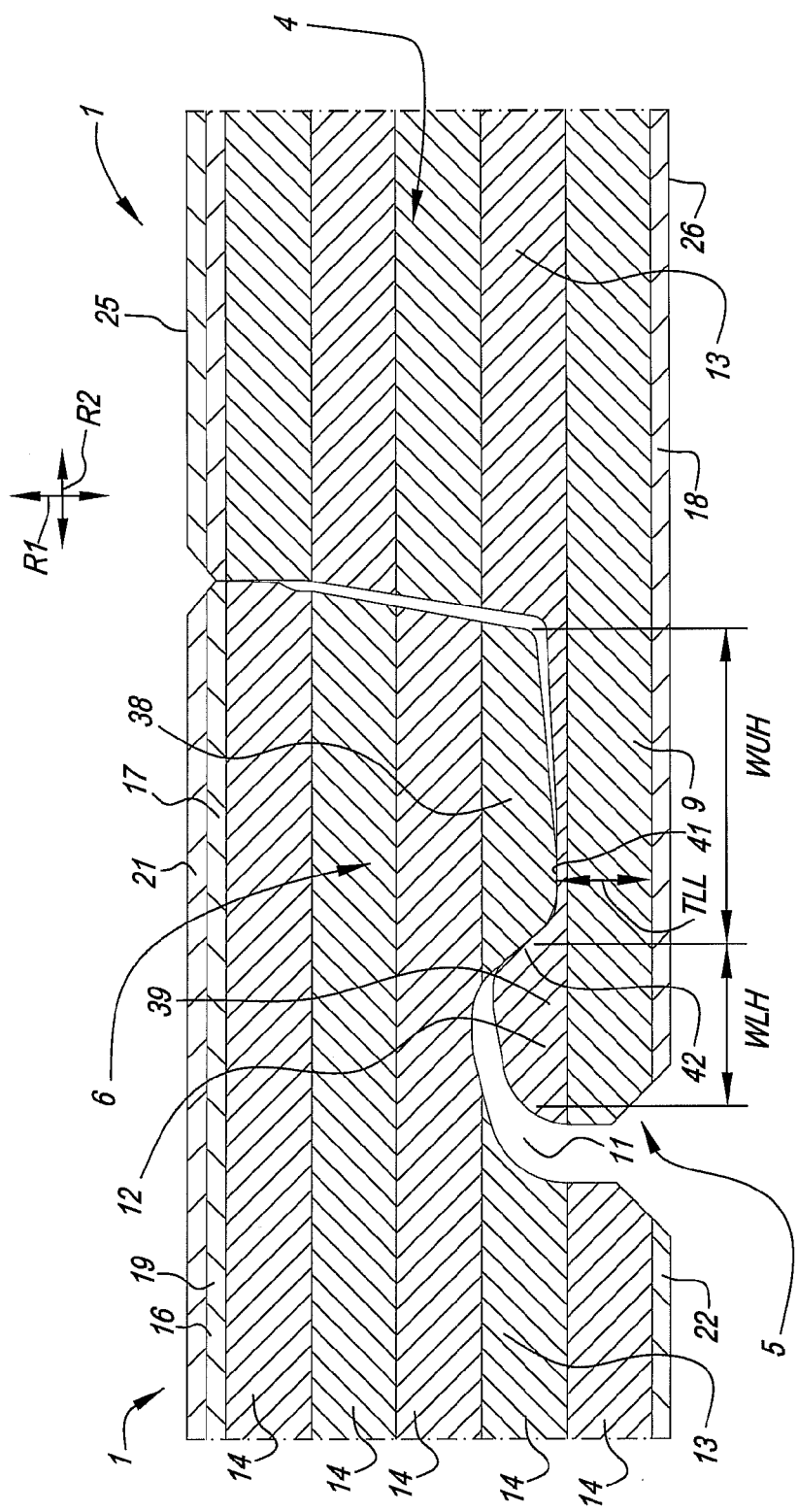

FIG. 11 shows a floor panel 1 with a similar build-up as in FIG. 10. In this case coupling parts 6 have been applied to at least one pair of opposite edges 4-5, wherein these coupling parts 6 allow for a horizontal alignment. In this case, horizontal alignment is obtained by the interconnection of an upper hook-shaped coupling part 38 at one edge 4, and a lower hook-shaped coupling part 39 at the other edge 5. These interconnected hook-shaped coupling parts 38-39 prevent separation of the coupled panels 1 in the horizontal direction R2, but is unable to align the panels 1 in the vertical direction R1 such that a coupling without height differences cannot be assured.

In connection to FIGS. 10 and 11 it is remarked that, whatever form the coupling parts 6 have, the dimension of the operational parts thereof are preferably larger than the thickness T3 of one core carrier layer 14 provided with resin 15, and preferably comprises parts of at least two such carrier layers 14. Still better the operational parts thereof preferably comprise at least the complete thickness T3 of at least one such carrier layer 14 provided with resin 15. Such embodiments lead to particularly stable connections. It is noted that in this context, the thickness T3 of one such carrier layer 14 provided with resin 15 can approximately be derived from the thickness T4 of the core material 13 divided by the number of carrier sheets or cardboard sheets 14.

In the case of FIG. 10 the dimensions of the operational parts of the second locking system, namely the thickness TLL of the lower lip and the thickness TUL of the upper lip 10 at the location of the contact surfaces 40-41 with the tongue, or at the average location thereof, is larger than one times the thickness T3 of each core carrier layer 14 provided with resin 15. Further, in the case of FIG. 10, the vertical distance TT between the contact surfaces 40-41 of the tongue 7 is also larger than the thickness T3 of one core carrier layer 14 impregnated with resin 15.

In the case of FIG. 11 the dimension of the operational parts of the first locking system, namely of the width WUH of the upper hook-shaped coupling part 38 and the width WLH of the lower hook-shaped coupling part 39, at the location of the contact surfaces 42 is larger than one times the thickness T3 of each core carrier layer 14 impregnated with resin 15.

Figure 12:
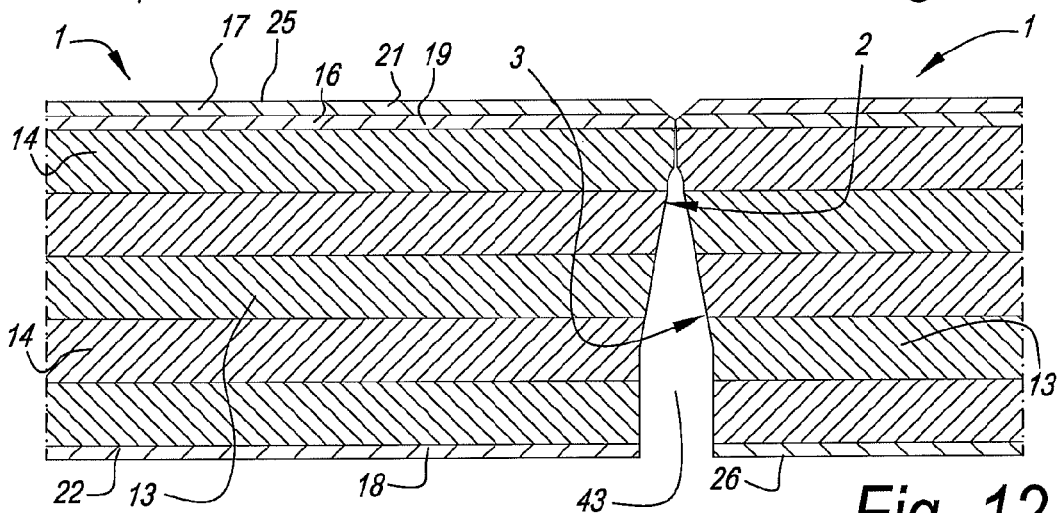

FIG. 12 shows a panel with a similar build-up as in FIGS. 10 and 11. In this case the panel 1 at least at two opposite edges 2-3 is free from coupling parts 6 or at least free from interconnecting profiles, such as interconnecting tongues 7 and grooves 8 or interconnecting hook-shaped coupling parts 38-39. The edges 2-3 are however profiled, such that in an adjacent condition of respective edges 2-3 of two such panels, a glue chamber 43 originates underneath the surface of adjoining panels 1, wherein this glue chamber 43 defines an interstice at the bottom or back side 26 of the panels 1, allowing the glue from the underground to enter the chamber 43.

Figure 13:
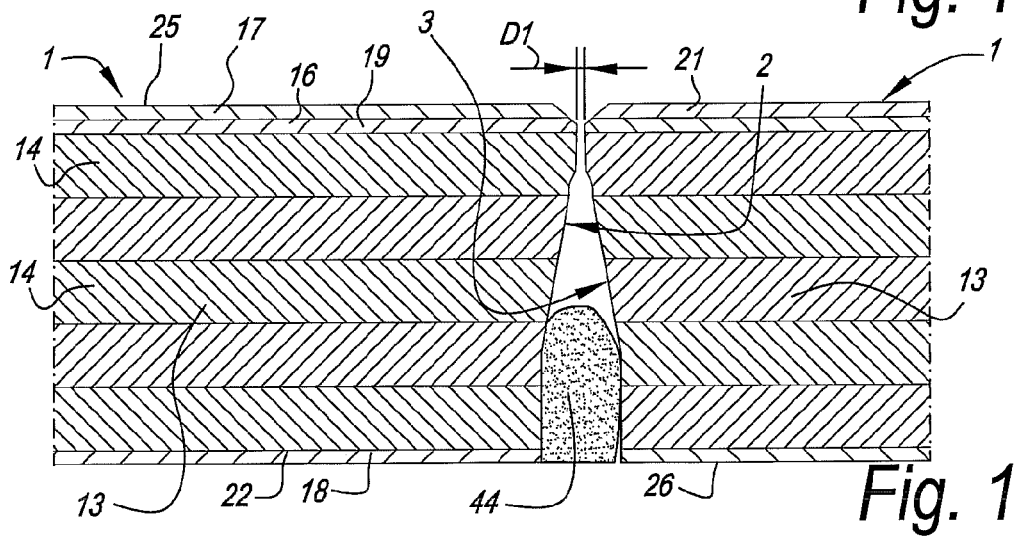

FIG. 13 shows a panel 1 with a similar build-up and profiled edges 2-3 as in FIG. 12. In this case one edge 2 of the opposite edges 2-3 has been provided with a spacer or spacing material 44. Such spacer or spacing material 44 is in fact a laying aid that enables the installer to respect a certain minimal distance D1 between the coupled panels 1. Preferably such spacer or spacing material 44 is flexible such that it allows for shrinkage and expansion of the adjacent panels 1.

Figure 14:
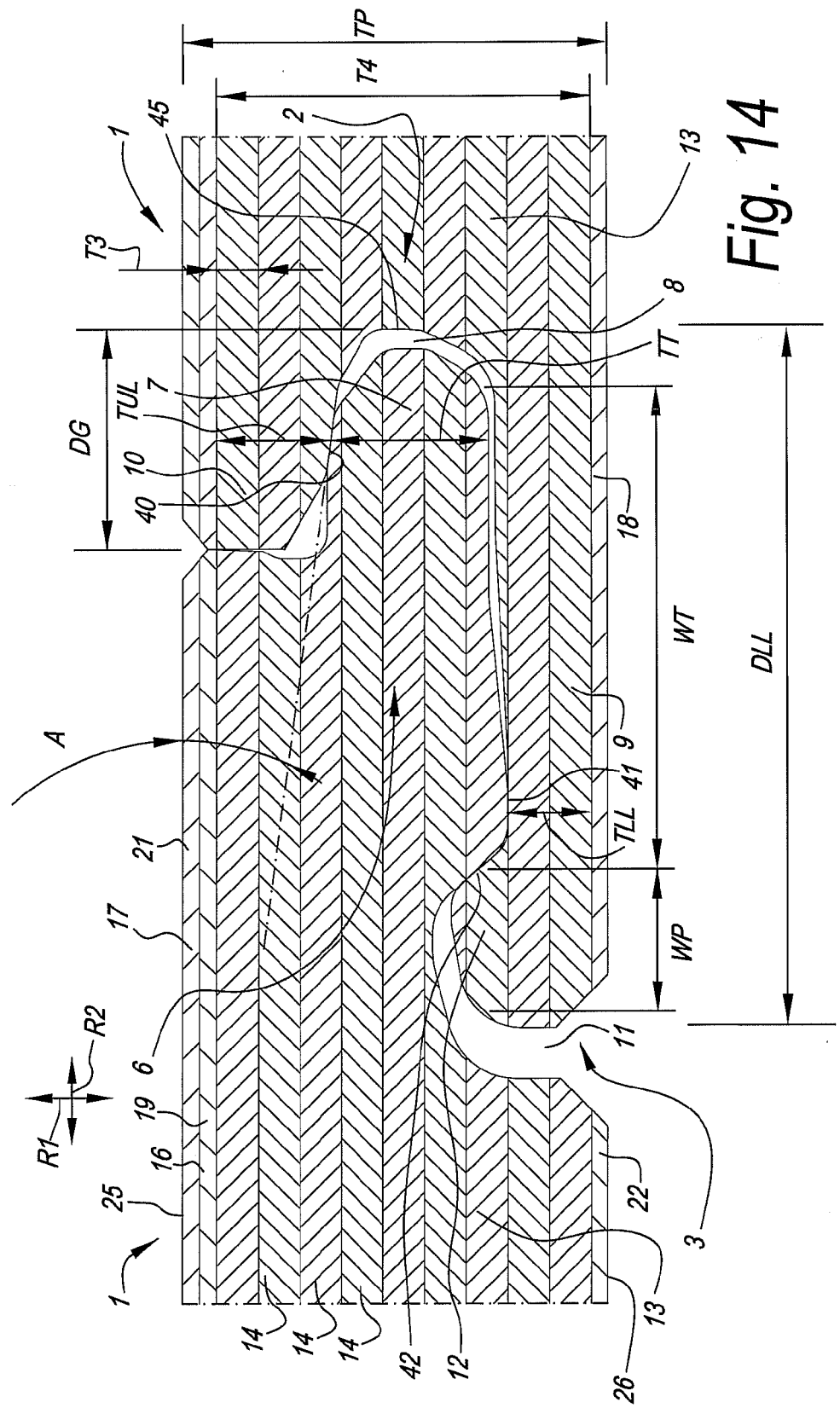

FIG. 14 shows a panel 1 with a core material 13 assembled from at least seven, in this case nine, resin impregnated cardboard sheets 14. At least two opposite edges 2-3 of the panel 1 have been provided with coupling parts 6 that form both a first locking system, effecting a locking in the plane of the panels 1 and perpendicularly to said edges 2-3, namely a locking in the horizontal direction R2, and a second locking system, effecting a locking perpendicularly to the plane of the panels 1, namely a locking in the vertical direction R1. The coupling parts 6 illustrated here are basically formed as a tongue 7 and groove 8 connection, allowing for said locking in the vertical direction R1, wherein the tongue 7, respectively at least one of the groove lips 9-10, in this case only the lower groove lip 9, has been provided with additional locking elements 11-12, effecting said locking in said horizontal direction R2. The respective locking elements 11-12 are formed as an excavation at the lower side of the tongue 7, that cooperates with a protrusion at the upper surface of the lower groove lip 8.

The coupling parts 6 are of the type that allows that two of such panels 1 can be coupled to each other, upon choice, by a rotational movement W or a horizontal shifting S movement of one panel 1 in respect of the other. In this case the coupling parts 6 are realized entirely of the core material 13.

The dimensions of the operational parts of the coupling parts 6 are preferably larger than the thickness T3 of one core carrier layer 14 impregnated with resin 15, and hence preferably comprise parts of at least two such carrier layers 14 impregnated with resin 15. Still better the operational parts thereof preferably comprise at least the complete thickness T3 of at least one such carrier layer 14 impregnated with resin 15. Such embodiments lead to particularly stable connections. In the case of FIG. 14 the operational parts comprise at least the complete thickness T3 of at least two such carrier layers 14 impregnated with resin 15.

In the case of FIG. 14, the dimension of the operational parts of the second locking system, namely the thickness TLL of the lower lip 9 and the thickness TUL of the upper lip 10 at the location of the contact surfaces 40-41 with the tongue 7 is larger than one times the thickness T3 of each core carrier layer 14 impregnated with resin 15. Further, in the case of FIG. 14, the vertical distance TT between the contact surfaces 40-41 of the tongue 7 is also larger than the thickness T3 of one core carrier layer 14 impregnated with resin 15. In this case the contact surfaces 40-41 are distinctly horizontally offset. The tongue 8, all over this horizontal offset, possesses a thickness that is larger than the thickness T3 of one core layer 14 impregnated with resin 15. In this case the thickness of the tongue 7 over the complete horizontal offset is equal to or larger than the vertical distance TT between the contact surfaces 40-41.

Further, in the case of FIG. 14, the dimension of the operational parts of the first locking system, namely of the width WT of the tongue 7 the width WP of the protrusion, or locking element 12, at the lower groove lip 9, at the location of the contact surfaces 42, actually at the midpoint of the contact surfaces 42, is larger than one times the thickness T3 of each core carrier layer 14.

As is illustrated here, preferably the depth DG of the groove, or the distance by which the upper groove lip 10 extends from an innermost point 45 of the groove 8, is larger than 0.45 times the total panel thickness TP. Preferably, as is the case here, the distance DLL by which the lower groove lip 9 extends from an innermost point 45 of the groove 8, is larger than 1.5 times the total panel thickness TP.

FIG. 14 further illustrates that the contact surfaces 40 between the upper side of the tongue 7 and the lower side of the upper groove lip 10 are preferably inclined over an angle A with the surface of the panel 1. Preferably said angle A is smaller than 12°. In this case an angle of 8° is shown. Such angle A allows for a straightforward machining of the groove 8 by means of rotating cutter devices.

Figure 15:
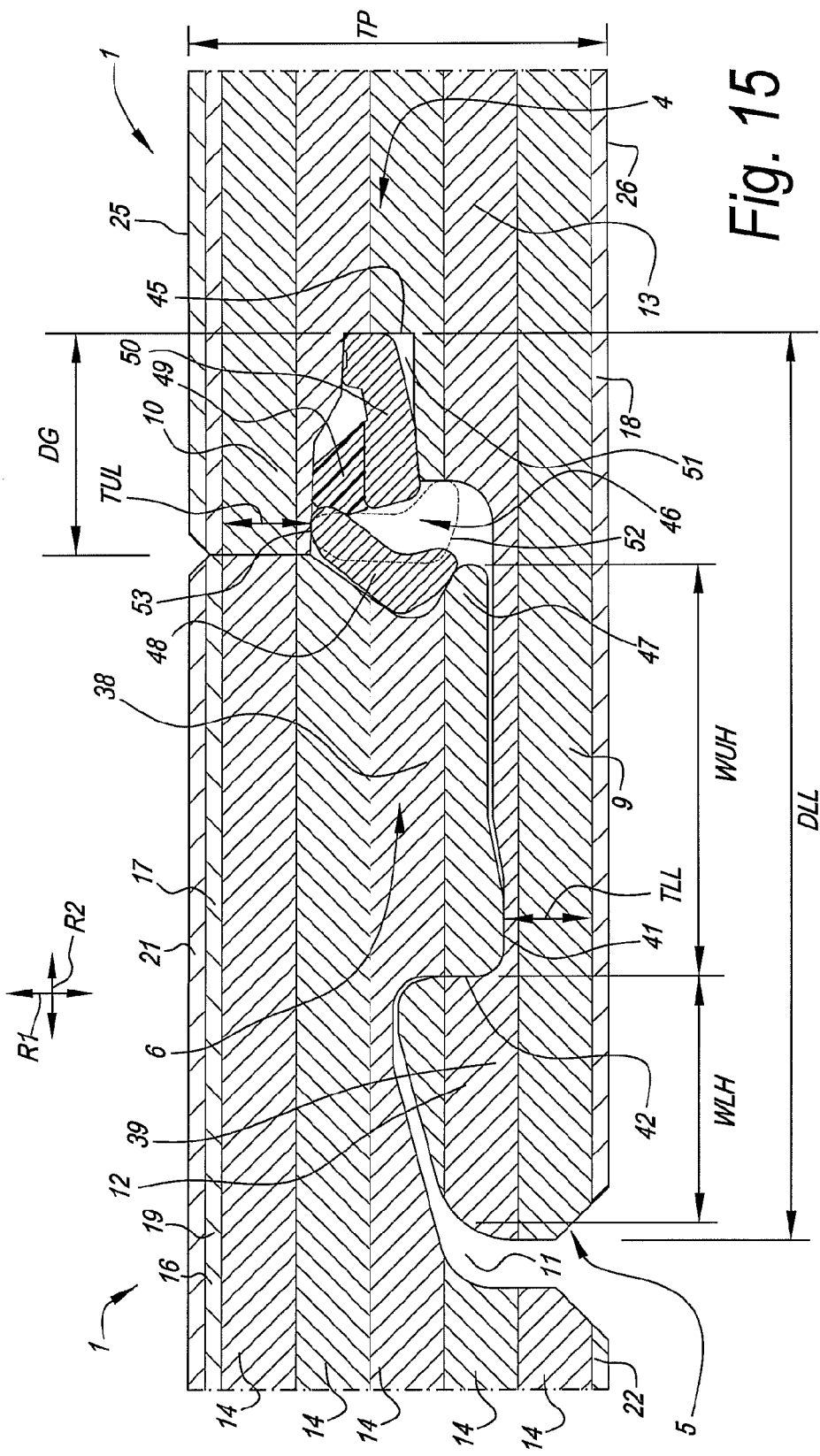
FIG. 15 in a view similar to that of FIG. 11 illustrates a variant.

FIG. 15 shows an embodiment with coupling parts 6 at the short edges 4-5 that form both a first locking system, effecting a locking in the plane of the panels 1, and perpendicularly to said edges 4-5, namely a locking in the horizontal direction R2, and a second locking system, effecting a locking perpendicularly to the plane of the panels 1, namely a locking in the vertical direction R1. The coupling parts 6 are of the type allowing that two of such floor panels 1 can be coupled to each other at the respective edges 4-5 by means of a downward movement of one panel 1 in respect to the other. The coupling parts 6 are realized substantially of the core material 13. The first locking system is formed at least of an upwardly directed lower hook-shaped portion 39 situated at one of the respective edges 5, as well as a downwardly directed upper hook-shaped portion 38 situated at the opposite edge 4. The cooperation of said upper and lower hook-shaped portion 38-39 in coupled condition of two such panels 1 is at least partially, and in this case wholly, responsible for said locking in said horizontal direction R2. The second locking system comprises a separate insert 46 connected to one of said two opposite edges 5. The separate insert 46 and a cooperating locking portion 47 of the opposite edge 4 are at least partially responsible for said locking in said vertical direction R1.

The separate insert 46 illustrated here comprises a pivotable locking element 48 and a a hinge portion 49 connected thereto. The separate insert 46 is placed with a connection portion 50 thereof in a groove 51. The dashed line 52 illustrates an extreme position taken by the locking element 48 upon downwardly introducing the lower hook shaped portion 38 into the edge 4 of the other panel 1. Towards the end of the coupling operation the locking element 48 pivots or flexes back to cooperate with the locking portion 47 of the opposite edge 4.

FIG. 15 makes clear that the insert 46 might be formed out of several materials for example by coextruding at least the locking element 48 and the hinge portion 49. It is clear that the hinge portion is preferably made of a softer, more flexible material than the locking element 48. Use could be made of hard PVC (Polyvinylchloride) for the locking element 48, while polyurethaan is used for the hinge portion 49.

FIG. 15 illustrates further that also in this case the thickness TUL of the upper lip 10 and the thickness TLL of the lower lip 9 is preferably larger than one times the thickness T3 of each carrier sheet 14 provided with resin 15. It is clear that the lower lip 9 and the upper lip 10 in this case border the above mentioned groove 51 into which the insert 46 is connected. The thickness TLL of the lower lip 9 is still defined at the location of the contact surface 41 between the lower hook shaped part 39 and the upper hook shaped part 38. The thickness TUL of the upper lip 10 however is defined at the contact surface 53 between the lower side of the upper lip 10 and the locking element 48 of the insert 46.

FIG. 15 further illustrated that the depth DG of the groove 51 is larger than 0.45 times the total panel thickness TP. The distance DLL by which the lower lip 9 extends from an innermost point 45 of the groove 51, is larger than 1.5 times the total panel thickness TP.

The width WUH of the upper hook shaped part 38 and the width WLH of the lower hook shaped part 39, at the location of the contact surfaces 42 is larger than one times the thickness T3 of each core carrier layer 14 impregnated with resin 15.

In the case of a rectangular oblong panel coupling parts 6 as illustrated in the FIGS. 2, 3, 9, 10, 14 are preferably provided at least at the long pair of opposite edges, while coupling parts 6 as illustrated in the FIGS. 11 and 15 are preferably applied at least at the short pair of opposite edges.

It is further clear that, independently of the type of coupling parts 6 that is applied, the presence of a groove 10-51 in the edge of a panel 1 is preferably such that the thickness of the upper lip 10 and/or the thickness of the lower lip 9 is nowhere less or always greater than one times the thickness T3 of each core carrier layer 14. Preferably the thinnest portions of the upper lip 10 and/or the lower lip 9 comprise parts of at least two such core carrier layers 14.

The present invention is in no way limited to the herein above-described embodiments, however, such floor panels and methods may be realized according to various variants, without leaving the scope of the present invention.

The invention claimed is:

1. A floor panel comprising:
parallel upper and lower major surfaces;
a core having upper and lower surfaces, the core located between the upper and lower major surfaces of the floor panel:
   wherein the core is assembled at least from a metal layer and a plurality of carrier sheets impregnated with a thermosetting resin; and
   wherein the plurality of carrier sheets extend in a direction parallel to the upper and lower major surfaces of the floor panel;
a first edge and a second edge:
   wherein the first and second edges are located between the upper and lower major surfaces of the floor panel;
   wherein the first and second edges are located opposite one another;
   wherein the first edge defines a groove, and wherein the second edge defines a tongue;
   wherein the groove is bordered by upper and lower lips having upper and lower contact surfaces, respectively:
      wherein the upper and lower contact surfaces are arranged for engagement with a tongue of another one of the floor panel;
      wherein an upper lip thickness (TUL) of the upper lip is defined between the upper surface of the core and the upper contact surface, and wherein a lower lip thickness (TLL) is defined between the lower surface of the core and the lower contact surface; and
   wherein the upper lip thickness (TUL) and the lower lip thickness (TLL) are each at least once a thickness of each of the carrier sheets of the core.

2. The floor panel of claim 1, wherein said carrier sheets each have a weight between 150 and 450 grams per square meter.

3. The floor panel of claim 1, wherein the carrier sheets comprise paper-based sheets, and the core by weight overall comprises more resin than paper.

4. The floor panel of claim 1, wherein the carrier sheets comprise paper-based sheets, and each carrier sheet, in a dry condition as having less than 7 weight percent humidity carries an amount of resin that is between 1 and 2 times the weight of a respective paper sheet of the carrier sheets.

5. The floor panel of claim 1, wherein said core comprises 5 or 6 to 15 carrier sheets, each carrier sheet including a resin impregnated paper sheet.

6. The floor panel of claim 1, wherein said floor panel has a weight between 3 and 10 kilograms per square meter.

7. The floor panel of claim 1, wherein said floor panel has a density between 800 and 2400 kilograms per cubic meter.

8. The floor panel of claim 1, wherein said floor panel has an overall thickness (TP) between 2 and 5 millimeters.

9. The floor panel of claim 1, further comprising a print applied on a paper sheet having a weight between 20 and 150 grams per square meter.

10. The floor panel of claim 1, further comprising a wear resistant layer including a resin, an impregnated paper sheet and/or hard particles having an average particle size between 1 and 200 micrometer.

11. The floor panel of claim 1, wherein said core comprises filling particles obtained from scrap paper.

12. The floor panel of claim 1, wherein said resin comprises one or more thermosetting resins chosen from the list consisting of melamineformaldehyde, ureumformaldehyde, melamineureumformaldehyde, lignosulfonate.

13. The floor panel of claim 1, wherein the majority of said plurality of carrier sheets shows one or more of the following properties:
   the property that said majority has a specific density of less than 750 kilogram per cubic meter;
   the property that said majority has an absorbency according to Klemm's method of lower than 60 millimeters;
   the property that said majority has a wet tensile strength of above 500 N/m.

14. The floor panel of claim 1, wherein said thermosetting resin is a melamine or phenol resin.

15. The floor panel of claim 1, wherein said floor panel comprises a beveled transitional region extending from the upper major surface of the floor panel to at least one of the first and second edges, wherein the print follows the contours of the beveled transitional region and extends to the at least one of the first and second edges.

16. The floor panel of claim 1, further comprising a relief realized at the upper major surface of said panel, wherein the relief comprises an embossment having a depth of more than 0.5 mm.

17. A method for manufacturing the floor panel of claim 1, wherein the resin impregnated carrier sheets are consolidated by means of a short cycle press.

18. A method for manufacturing the floor panel of claim 16, wherein the relief on the upper major surface of the panel is realized by means of a structured press plate.

* * * * *